(12) United States Patent
Jung et al.

(10) Patent No.: US 12,681,758 B2
(45) Date of Patent: Jul. 14, 2026

(54) MEMORY DISAGGREGATION METHOD, COMPUTING SYSTEM IMPLEMENTING THE METHOD

(71) Applicant: KOREA ADVANCED INSTITUTE OF SCIENCE AND TECHNOLOGY, Daejeon (KR)

(72) Inventors: Myoungsoo Jung, Daejeon (KR); Donghyun Gouk, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 646 days.

(21) Appl. No.: 18/161,169

(22) Filed: Jan. 30, 2023

(65) Prior Publication Data

US 2024/0012684 A1 Jan. 11, 2024

(30) Foreign Application Priority Data

Jul. 8, 2022 (KR) ........................ 10-2022-0084584

(51) Int. Cl.
| | |
|---|---|
| *G06F 9/50* | (2006.01) |
| *G06F 3/06* | (2006.01) |
| *G06F 13/42* | (2006.01) |

(52) U.S. Cl.
CPC .......... *G06F 9/5016* (2013.01); *G06F 3/0613* (2013.01); *G06F 3/0659* (2013.01); *G06F 3/067* (2013.01); *G06F 13/4221* (2013.01)

(58) Field of Classification Search
None
See application file for complete search history.

(56) References Cited

U.S. PATENT DOCUMENTS

| | | | |
|---|---|---|---|
| 2020/0322287 A1 | 10/2020 | Connor et al. | |
| 2021/0112132 A1 | 4/2021 | Paliwal et al. | |
| 2022/0066636 A1 | 3/2022 | Patterson | |
| 2022/0164288 A1 | 5/2022 | Ramagiri et al. | |
| 2022/0197556 A1 | 6/2022 | Bert et al. | |
| 2023/0116820 A1* | 4/2023 | Banerjee ............... | H04L 47/829 |
| | | | 709/226 |

FOREIGN PATENT DOCUMENTS

| | | |
|---|---|---|
| CN | 113645258 | 11/2021 |
| KR | 10-2021-0059649 | 5/2021 |
| KR | 10-2021-0124082 | 10/2021 |
| KR | 10-2021-0147865 | 12/2021 |
| KR | 10-2021-0147976 | 12/2021 |

OTHER PUBLICATIONS

Hasan Al Maruf et al., "TPP: Transparent Page Placement for CXL-Enabled Tiered Memory", arXiv:2206.02878v1 [cs.DC] Jun. 6, 2022.
Myoungsoo Jung, "Hello Bytes, Bye Blocks: PCIe Storage Meets Compute Express Link for Memory Expansion (CXL-SSD)", HotStorage '22, Jun. 27-28, 2022, Virtual Event, USA.

* cited by examiner

*Primary Examiner* — Scott C Sun
(74) *Attorney, Agent, or Firm* — LEX IP MEISTER, PLLC

(57) ABSTRACT

Disclosed is a memory disaggregation computing system including a host server and a memory device connected through a compute express link (CXL) network, in which a computing complex of the host server is connected to a memory resource of the memory device through a CXL packet transmitted through the CXL network, and executes an application program by using the memory resource.

11 Claims, 23 Drawing Sheets

FIG. 1

Prior Art

Prior Art

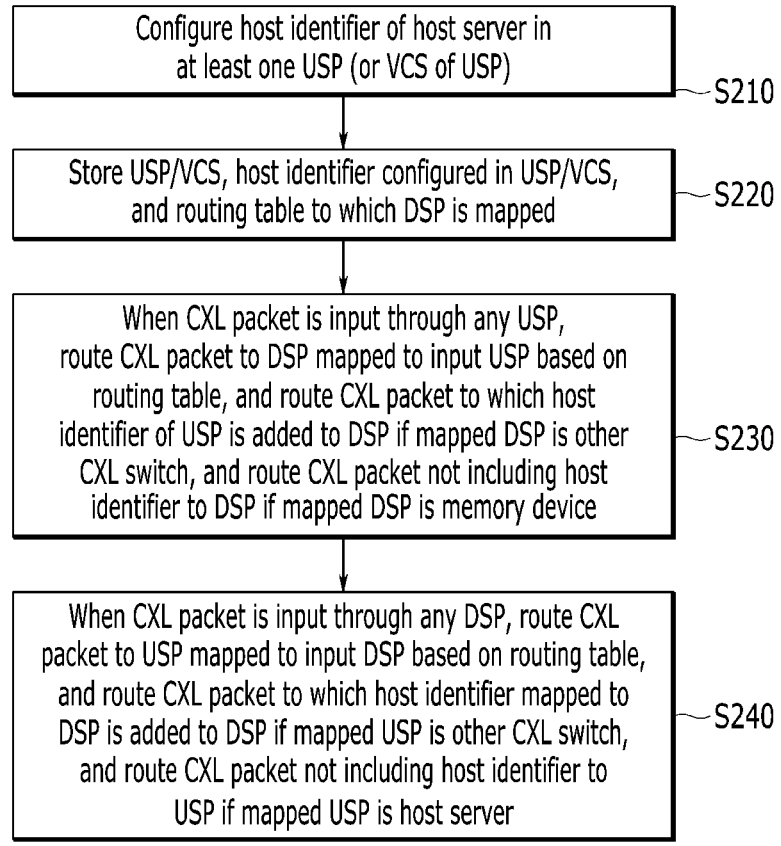

Configure host identifier of host server in
at least one USP (or VCS of USP)
~S210

Store USP/VCS, host identifier configured in USP/VCS,
and routing table to which DSP is mapped
~S220

When CXL packet is input through any USP,
route CXL packet to DSP mapped to input USP based on
routing table, and route CXL packet to which host
identifier of USP is added to DSP if mapped DSP is other
CXL switch, and route CXL packet not including host
identifier to DSP if mapped DSP is memory device
~S230

When CXL packet is input through any DSP, route CXL
packet to USP mapped to input DSP based on routing table,
and route CXL packet to which host identifier mapped to
DSP is added to DSP if mapped USP is other CXL switch,
and route CXL packet not including host identifier to
USP if mapped USP is host server
~S240

FIG. 22

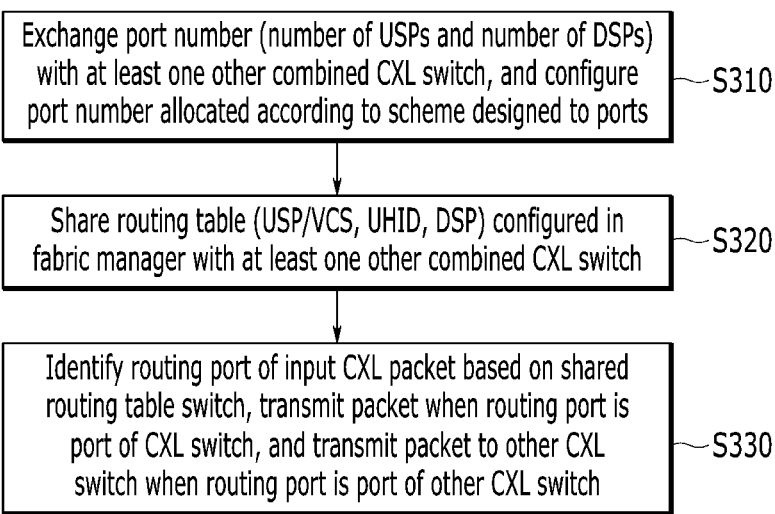

Exchange port number (number of USPs and number of DSPs) with at least one other combined CXL switch, and configure port number allocated according to scheme designed to ports ~S310

Share routing table (USP/VCS, UHID, DSP) configured in fabric manager with at least one other combined CXL switch ~S320

Identify routing port of input CXL packet based on shared routing table switch, transmit packet when routing port is port of CXL switch, and transmit packet to other CXL switch when routing port is port of other CXL switch ~S330

MEMORY DISAGGREGATION METHOD, COMPUTING SYSTEM IMPLEMENTING THE METHOD

CROSS-REFERENCE TO RELATED APPLICATION

This application claims priority to and the benefit of Korean Patent Application No. 10-2022-0084584 filed in the Korean Intellectual Property Office on Jul. 8, 2022, the entire contents of which are incorporated herein by reference.

BACKGROUND

(a) Field

The present disclosure relates to a memory disaggregation technique.

(b) Description of the Related Art

Since memory disaggregation increases memory resource utilization of a data center, and facilitates better resource management, the memory disaggregation has been attracting much attention. In order to realize memory disaggregation in a large-scale system, studies based on software or hardware are conducted. Conventional memory disaggregation studies use remote direct memory access (RDMA) methods for data movement between a host and a remote memory. However, the RDMA requires software execution for unnecessary data copy or network processing for network based data movement, and this is one of the causes which make remote memory access be slower than local memory access by tens to hundreds of times.

In recent years, a compute express link (CXL) standard has been opened, which can connect a host processor, an accelerator, and an input/output device. The CXL is designed to manage various heterogeneous computing devices such as the host processor or the accelerator, but it is considered that a cache coherent interconnect of the CXL will be utilized for the memory disaggregation. However, a hardware structure and a memory aggregation method for applying the CXL standard to the memory aggregation are not concrete, so even though the CXL has a great potential for the memory aggregation, there is a limit that the CXL is not yet realized.

The above information disclosed in this Background section is only for enhancement of understanding of the background of the invention, and therefore it may contain information that does not form the prior art that is already known in this country to a person of ordinary skill in the art.

SUMMARY

The present disclosure has been made in an effort to provide a memory disaggregation method, and a computing system implementing the method.

The present disclosure has also been made in an effort to provide a direct CXL connection in which a host server can directly access a remote memory resource and a memory disaggregation method through the same.

The present disclosure has also been made in an effort to provide a CXL switch for the CXL connection between the host server and a memory device.

An exemplary embodiment of the present disclosure provides a memory disaggregation computing system, which includes: a host server and a memory device connected through a compute express link (CXL) network, in which a computing complex of the host server is connected to a memory resource of the memory device through a CXL packet transmitted through the CXL network, and executes an application program by using the memory resource.

The memory device may include the memory resource, a memory controller of the memory resource, and a CXL controller receiving a first CXL packet including a memory request of the host server, converting the first CXL packet into the memory request for the memory controller, and delivering the memory request, and converting a result processed by the memory controller into a second CXL packet, and transmitting the second CXL packet to the host server.

The memory request may include a data load command in the memory device or a data store command in the memory device.

The host server may collect memory resource information of the memory device, maps the memory resource information to a physical memory space, and then transmit a base address of the mapped physical memory space to the memory device, and the memory device stores the base address in which the memory resource thereof is mapped to the physical memory space of the host server.

The memory resource information and the base address may be transmitted according to a CXL.io protocol.

The memory disaggregation computing system may further include at least one CXL switch connecting the host server and the memory device.

The CXL switch may configure a host identifier of at least one host server for each upstream port (USP), and transmit a packet to which a corresponding host identifier is added upon transmitting a CXL packet between CXL switches.

The CXL switch may include a computing complex processing a command the host server, and perform an operation according to the command by accessing the memory device according to the command of the host server, and provide a performing result to the host server.

Another exemplary embodiment of the present invention provides an operating method of a host server, which includes: collecting memory resource information of a compute express link (CXL) based memory device; mapping the memory resource information to a physical memory space, and then transmitting a base address of the mapped physical memory space to the memory device; converting a memory request for a memory resource of the memory device into a CXL packet, and transmitting the CXL packet to the memory device; and receiving a response to a result processed according to the memory request from the memory device.

The memory resource information may be collected according to a CXL.io protocol.

The memory resource information may comprise a size of a base address register and a size of a host-managed device memory (HDM).

In the transmitting to the memory device, when a computing complex of the host server makes a memory request of a load command or a data store command to a system memory space which the HDM is mapped, a root port (RP) within the computing complex receiving the memory request may convert the memory request into the CXL packet and transmit the CXL packet to the memory device corresponding to an end point (EP).

The RP and the EP may be connected by a Peripheral Component Interconnect Express (PCIe)/FlexBus interface.

The CXL packet may be transmitted according to a CXL.mem protocol.

Yet another exemplary embodiment of the present invention provides an operating method of a CXL switch for a compute express link (CXL) network, which includes: configuring a host identifier of at least one host server connected to an upstream port for each upstream port; and routing a input CXL packet from a first port to a second port based on a routing table in which the upstream port and a downstream port are mapped for each host identifier. The routing the CXL packet comprises transmitting a CXL packet to which the configured host identifier is added, to the second port, when a port connected to the second port is a port of another CXL switch.

The routing the CXL packet may comprise transmitting a CXL packet not including the configured host identifier, to the second port, when the port connected to the second port is a port of a host server or a memory device.

The configuring the host identifier may comprise searching host servers connected based on host list propagation between CXL switches connected to the CXL network, and allocating a unique host identifier to each searched host server.

The operating method may further include: exchanging port information of the CXL switch with at least one other combined CXL switch, and configuring different port numbers in ports of the combined CXL switches; and sharing a routing table of the CXL switch with the at least one other combined CXL switch.

The operating method may further include: identifying a routing port of an input CXL packet based on the routing table shared with at least one other combined CXL switch, transmitting a packet to the corresponding port when the routing port is the port of the CXL switch, and transmitting the packet to the other CXL switch when the routing port is the port of the other CXL switch.

According to an exemplary embodiment of the present disclosure, since unnecessary data copy is not required when data moves between a host memory and a remote memory, a host server can access a remote memory resource with a best performance.

According to an exemplary embodiment of the present disclosure, the memory resource can be efficiently disaggregated by a conventional memory disaggregation scheme.

According to an exemplary embodiment of the present disclosure, since a CXL switch delivers packets by distinguishing a plurality of host servers, the scalability of memory disaggregation can be increased while following a CXL standard.

According to an exemplary embodiment of the present disclosure, memory resources disaggregated by a direct CXL connection can provide a similar performance to a local memory when an application program can utilize a cache of a host processor.

According to an exemplary embodiment of the present disclosure, the direct CXL connection can provide a faster performance than a conventional RDMA.

BRIEF DESCRIPTION OF THE DRAWINGS

FIG. 1 is a diagram for describing a conventional remote direct memory access based memory disaggregation.

FIG. 2 is a conceptual diagram of a memory disaggregation computing system according to an exemplary embodiment.

FIGS. 3 and 4 are diagrams for describing a direct CXL connection according to an exemplary embodiment.

FIG. 6 is a diagram for describing a limitation of a conventional CXL switch.

FIG. 7 is a diagram for describing a problem which occurs when attempting a connection of one DSP and multiple USPs.

FIG. 9 is a diagram for describing a method for allocating a host identifier of a CXL network according to an exemplary embodiment.

FIGS. 10 to 12 are diagrams for describing a method for utilizing a CXL switch having a computing ability according to another exemplary embodiment.

FIGS. 14 to 16 illustrate an architecture example of a CXL based memory disaggregation according to an exemplary embodiment.

FIGS. 17 and 18 are diagrams for describing a combining method and an operating method of a CXL switch according to an exemplary embodiment.

FIG. 19 is a diagram for describing a memory disaggregation method for a virtual machine according to an exemplary embodiment.

FIG. 21 is a flowchart illustrating an operating method of a CXL switch for a multi-level connection according to an exemplary embodiment.

FIG. 22 is a flowchart illustrating an operating method of a CXL switch for a switch combination according to an exemplary embodiment.

DETAILED DESCRIPTION OF THE EMBODIMENTS

Figure 3:
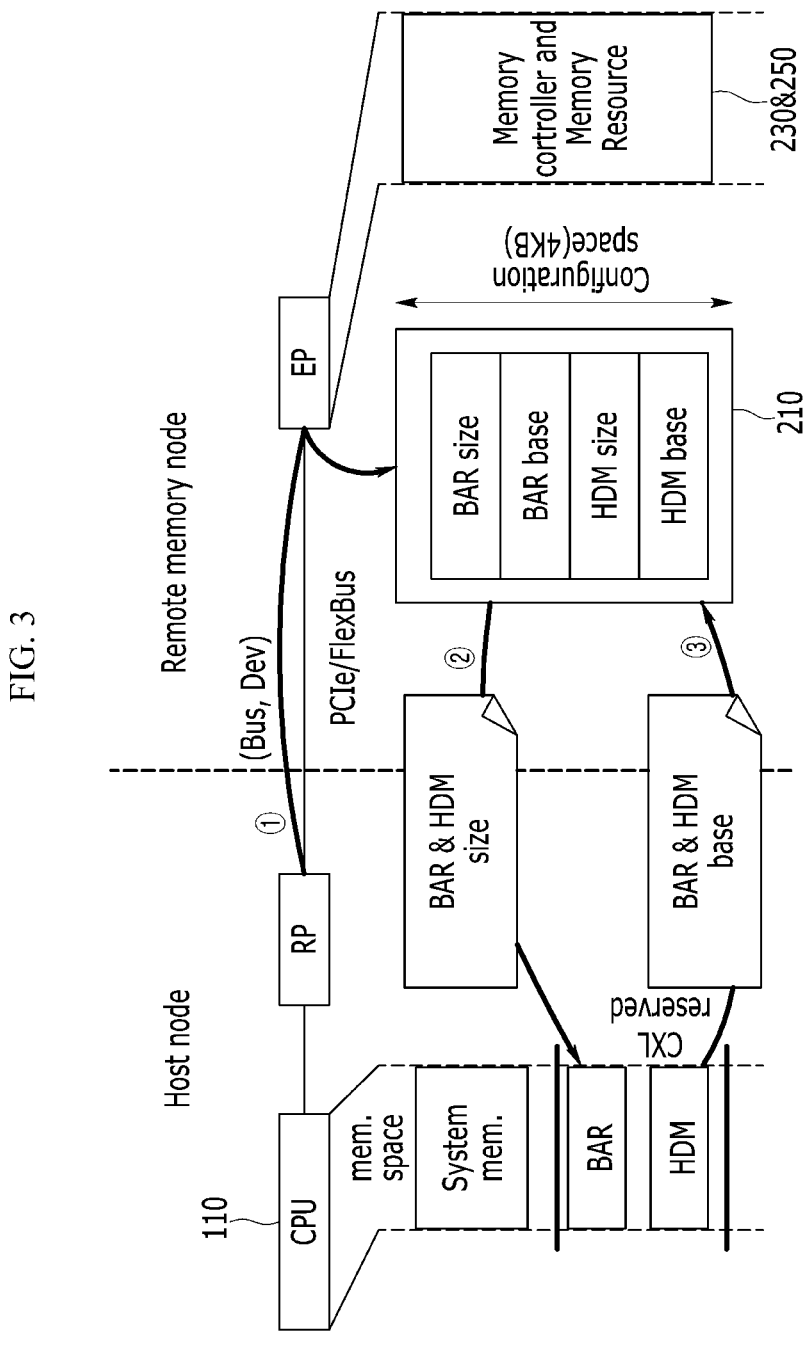

In the following detailed description, only certain exemplary embodiments of the present invention have been shown and described, simply by way of illustration. However, the present disclosure may be modified in various different ways, all without departing from the spirit or scope of the present disclosure. In addition, in the drawings, in order to clearly describe the present disclosure, a part not related to the description is not omitted and like reference numerals designate like elements throughout the specification.

In the description, reference numerals and names are attached for convenience of description, and devices are not particularly limited to reference numerals and names.

In the description, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

In the description, unless an expression disclosed as a singular number may be interpreted as a singular number or a plural number unless an explicit expression such as "one" or "single" is used. Terms including an ordinary number, such as first and second, are used for describing various elements, but the elements are not limited by the terms. The terms are used to discriminate one constituent element from another component.

Figure 1:
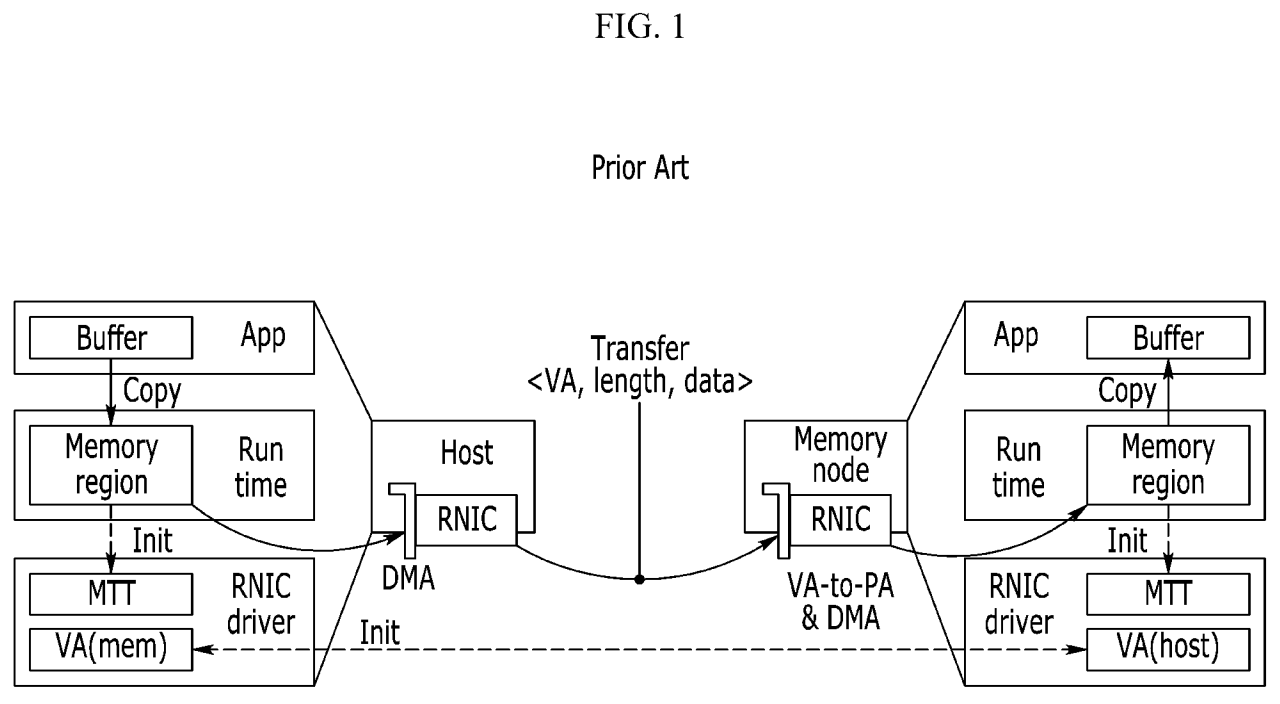

FIG. 1 is a diagram for describing a conventional remote direct memory access based memory disaggregation.

Referring to FIG. 1, a memory resource may not be provided, which is sufficient to execute an application program only by a local memory mounted on a host server. A memory disaggregation introduced to solve this connects one or more remote memory resources to a host server to allow an application program to be executed without being restricted by a local memory of the host server.

In a backend network connecting the host server and the remote memory resource, a remote direct memory access (RDMA) or similar DMA protocol thereto is primarily used. In this case, two nodes require a network card (RDMA network interface card (RNIC) in the case of the RDMA) that supports the DMA protocol, and software for processing a network protocol should be executed. Therefore, in an RDMA based memory disaggregation, a host node and a remote memory node should be implemented as servers which are mode-independently operable, and an operating system such as Linux or Windows is executed. In the RDMA based memory disaggregation, for data movement between the host server and the memory server, an application program (App) executed in each server defines one or more memory regions (MRs), and delivers a location of the memory region to the RNIC. An RNIC driver identifies physical addresses (PA) of memory pages which belong to the memory region, and registers the identified PA in a memory translation table (MTT) of the RNIC. A virtual address (VA) of the registered memory region is exchanged between two servers upon initialization.

Thereafter, the host server transfers the virtual address (VA) of the memory server and data to a memory server through the RDMA in order to write data to the memory server. The RNIC of the memory server converts the virtual address received by referring the MTT into the physical address (VA-to-PA), and writes data to an actual location of the memory region. In this case, in addition to the memory copy through the DMA, a process is required in which the application program executed in the host server copies data to be sent to the memory region, and the application program executed in the memory server copies and takes out data received from the memory region. Therefore, in the case of the RDMA, additional data copy should occur even in the local memory for data movement between devices. Further, a memory module (DRAM module) of the memory server and an interface are passive peripherals, so a separate computing device for controlling and managing the memory module by executing the application program is required in the memory server.

As such, the conventional memory disaggregation scheme including the RDMA shows deteriorated memory disaggregation performance because it requires data copy through the network, and the data should be pinned in the local memory. Further, for the RDMA based memory dis aggregation, the memory resource should be implemented as a separate server independent from the host server.

Next, a connection method will be described in which the host may directly access the remote memory resource by a direct CXL connection in which the host server transmits a memory request to the memory device through FlexBus of CXL, and the memory device delivers the memory request received through FlexBus to a memory controller.

Figure 2:
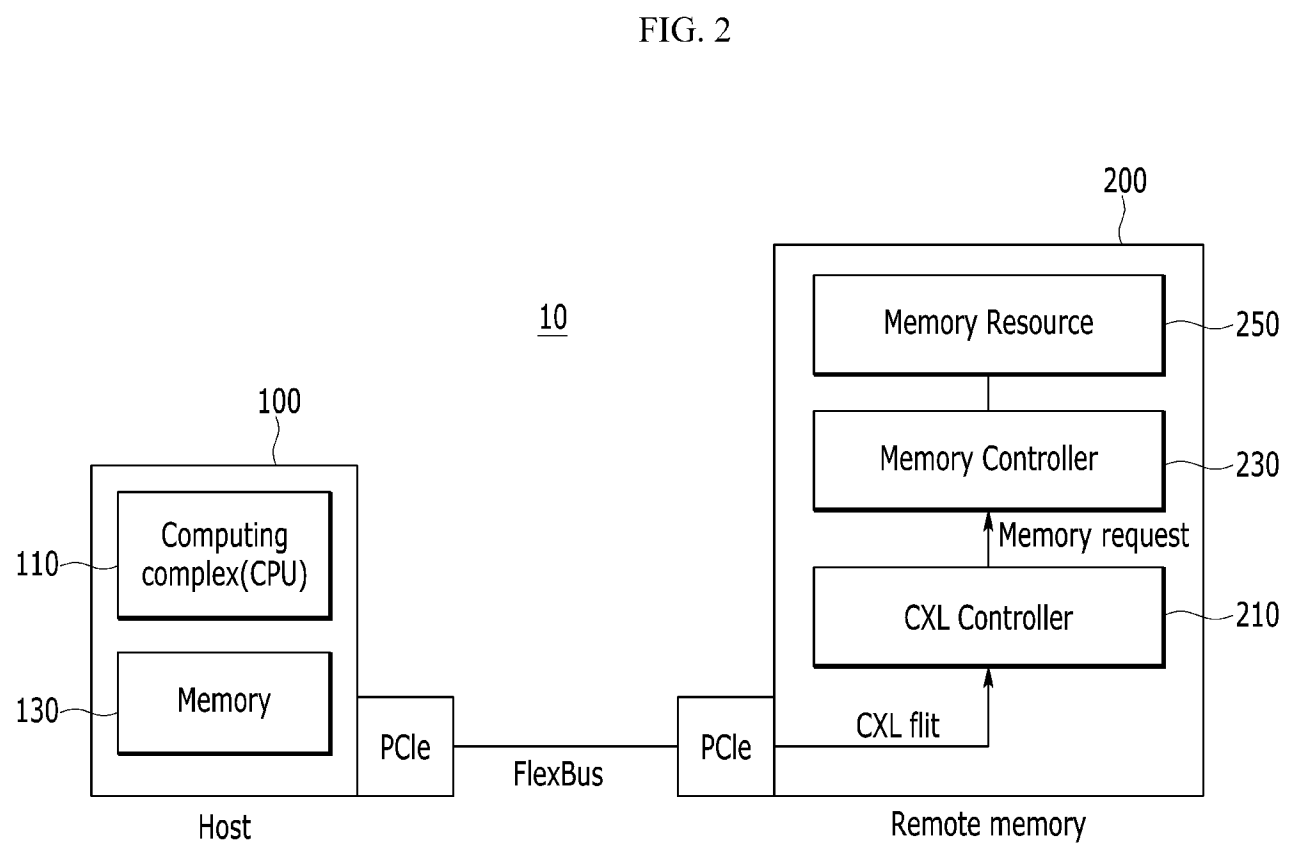
Figure 4:
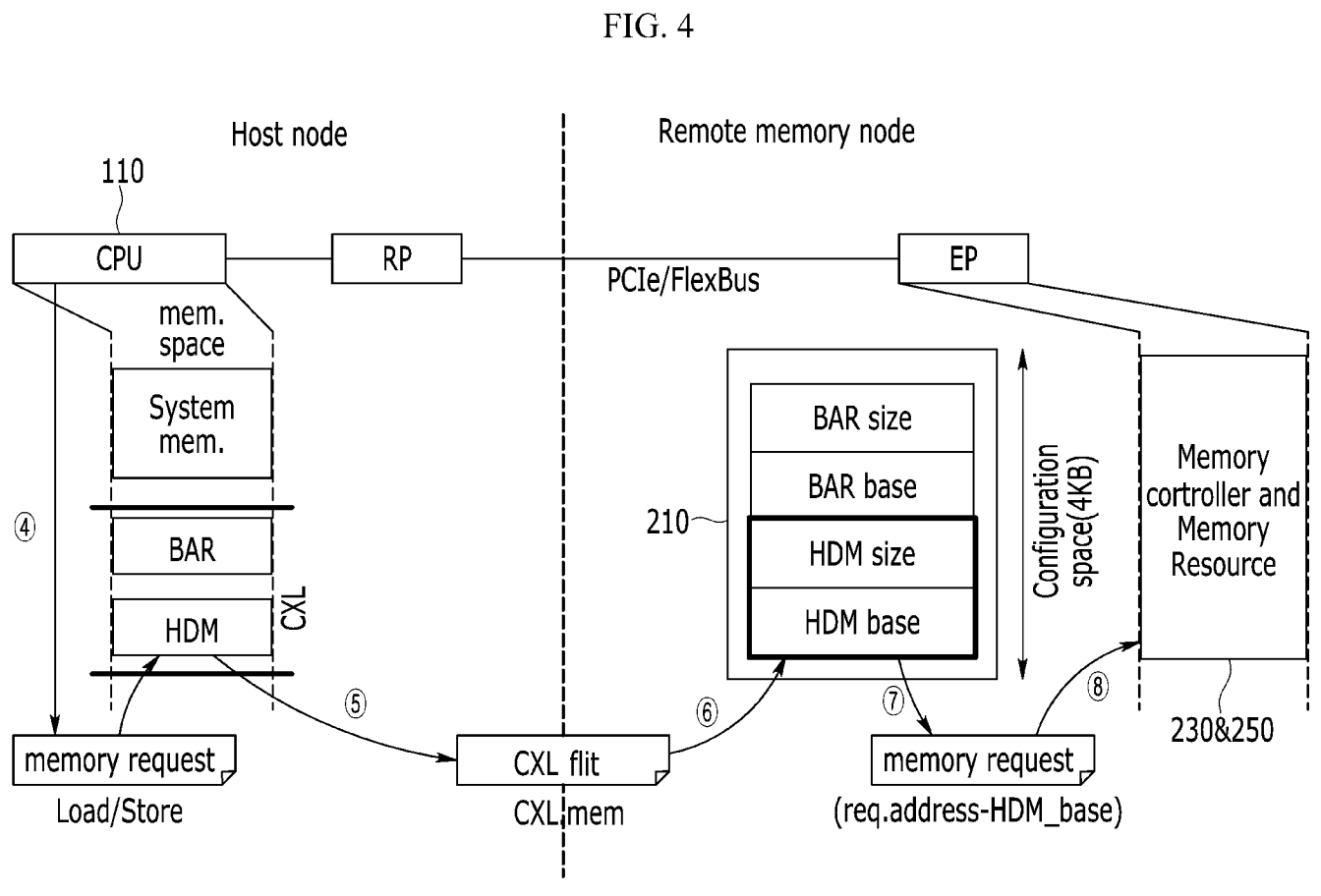

FIG. 2 is a conceptual diagram of a memory disaggregation computing system according to an exemplary embodiment, and each of FIGS. 3 and 4 is a diagram for describing a direct CXL connection according to an exemplary embodiment.

Referring to FIG. 2, a memory disaggregation computing system 10 may include a host server 100, and at least one memory device 200 connected to the host server 100 through a network. The memory disaggregation computing system 10 may further include a network switch connecting the host server 100 and the memory device 200. The network switch will be described in detail with reference to FIG. 5. In the description, the memory device 200 may be referred to as a CXL device that supports the direct CXL connection. The network switch may be called a CXL switch built in a CXL network. In the description, the host server may be called a host node or simply a host. In the description, the memory device may be called a memory node, a remote memory, or a CXL device.

The host server 100 may directly access the memory resource of the memory device 200 through a cache coherent interconnect. In the present disclosure, compute express link (CXL) is described as an example of the cache coherent interconnect, but the CXL may be replaced with another technology that supports the cache coherent interconnect. The CXL is a standard that defines a memory access scheme extends Peripheral Component Interconnect Express (PCIe), and complies with cache coherence between a CPU, and the host memory and an accelerator.

The host server 100 includes a computing complex 110 and a host memory resource 130. The computing complex 110 may be diversified, and in the description, a central processing unit (CPU) will be described as an example. The host server 100 may execute the application program by using the remote memory resource of the memory device 200 direct CXL connected jointly with the local memory resource 130.

The host server 100 and the memory device 200 may be connected to and communicate with each other through a network interface, e.g., PCIe/FlexBus. FlexBus defined in the CXL standard is an interface/interconnect which is operable as PCIe or CXL.

The memory device 200 may include a CXL controller 210, a memory controller 230, and a memory resource 250. The memory device 200 may include a buffer (not illustrated) in order to match an operating timing of various memory controllers which operate at a high speed, and enhance performance. The memory resource 250 may be constituted by, for example, a plurality of DRAM dual in-line memory modules (DIMMs). The memory controller 230 may include another non-volatile memory controller in addition to the DRAM controller. The memory controller 230 and the memory resource 250 may be connected by a general interface, e.g., a DDR interface. The memory resource 250 of the memory device 200 may be controlled by the computing complex 110 of the host server 100, so the memory device 200 may not include the computing complex such as the CPU.

Since the memory device 200 immediately delivers the memory request received through FlexBus to the memory controller to process the memory access of the host, software for network protocol processing is not intervened unlike the RDMA based memory disaggregation. Therefore, the memory device 200 need not be a server type connected to the host server in the RDMA based memory disaggregation, and may be implemented as a PCIe add-in-card, for example.

The host server 100 maps remote memory resource information to a system memory space, and informs the memory device 200 of a mapped base address. The remote memory resource information may include a size of a base address register (BAR) and a size of a host-managed device memory (HDM) managed by the host node. In the description, the memory managed by the host node among the memory resources of the memory device 200 may be simply referred to as HDM.

Thereafter, when the computing complex 110 transmits a memory request of commands load/store to the system memory space where the HDM is mapped, the memory request is converted into a CXL packet (CXL flit) and transmitted to the memory device 200. That is, the computing complex 110 gives a data load command to the HDM or a data store command to the HDM. Then, the CXL controller 210 of the memory device 200 may convert the CXL packet input through the network interface into the memory request, and deliver the memory request to the memory controller 230. The CXL controller 210 may generate an internal memory address based on the base address of the HDM included in the CXL packet, and deliver a request therefor to the memory controller 230. Thereafter, the CXL controller 210 converts a result processed by the memory controller 230 into the CXL packet, and transmits the CXL packet to the host server 100 to respond to the load/store command of the computing complex 110. In this case, the CXL packet transmitted between the host server 100 and the memory device 200 may be transmitted based on a CXL protocol, specifically, a CXL.mem protocol.

As such, the host server 100 may access the remote memory resource similarly to the local memory resource connected to an internal system bus. Such a connection scheme may be called the direct CXL connection.

Referring to FIG. 3, for the direct CXL connection based memory disaggregation, the memory resource information of the memory device 200 should be mapped to the physical memory space of the host server 100.

First, a bus in the computing complex (CPU) 110 of the host server 100 may include at least one root port (RP), and the root port (RP) may be connected to the memory device 200 corresponding to an end point (EP) ((①)). The root port (RP) and the end point (EP) may be connected through PCIe/FlexBus.

A kernel driver of the host server 100 collects the memory resource information of the memory device 200 ((②)). The collected memory resource information may be mapped to the physical memory space reserved for the CXL based remote memory resource. Since the CXL based memory device 200 supports a CXL.io protocol, the host server 100 may distinguish whether an arbitrary memory device is the CXL device or a general PCIe device by using the CXL.io protocol. The remote memory resource information may include a base address register size (BAR size) and a memory size (HDM size) managed by the host server, and include memory identification information (e.g., bus, device, function, number, etc.). The remote memory resource information may be managed in a configuration space of the memory device 200.

The kernel driver of the host server 100 maps the BAR and the HDM of the memory device 200 to the physical memory space based on the collected memory resource information. In addition, the kernel driver informs the memory device 200 of the base address of the physical memory space to which the BAR and the HDM are mapped ((③)).

The CXL controller 210 stores the base addresses of the BAR and the HDM in the configuration space.

Referring to FIG. 4, when the computing complex (CPU) 110 transmits the memory request of commands load/store to the system memory space to which the HDM is mapped ((④)), the memory request is delivered to the root port (RP).

The root port (RP) converts the memory request into the CXL packet (CXL flit) ((⑤)), and transmits the CXL packet to the memory device 200 corresponding to the end point (EP) ((⑥)). The CXL packet may be transmitted through the CXL.mem protocol.

The CXL controller 210 of the memory device 200 may convert the incoming CXL packet (CXL flit) through the network interface into the memory request ((⑦)), and deliver the memory request to the memory controller 230 ((⑧)). The CXL controller 210 may generate the internal memory address based on the base address of the HDM included in the CXL packet, and deliver the internal memory address to the memory controller 230.

Thereafter, the result processed by the memory controller 230 is converted into the CXL packet and transmitted to the root port (RP). The root port (RP) may respond to the load/store command to the computing complex 110.

As such, while the host server 100 accesses the CXL-connected memory resource (HDM) using the load/store command, software intervention for copy to the memory region or data processing does not occur. Therefore, the direct CXL connection makes the host server 100 very rapidly access the remote memory resource as compared with the conventional memory disaggregation scheme.

Figure 5:
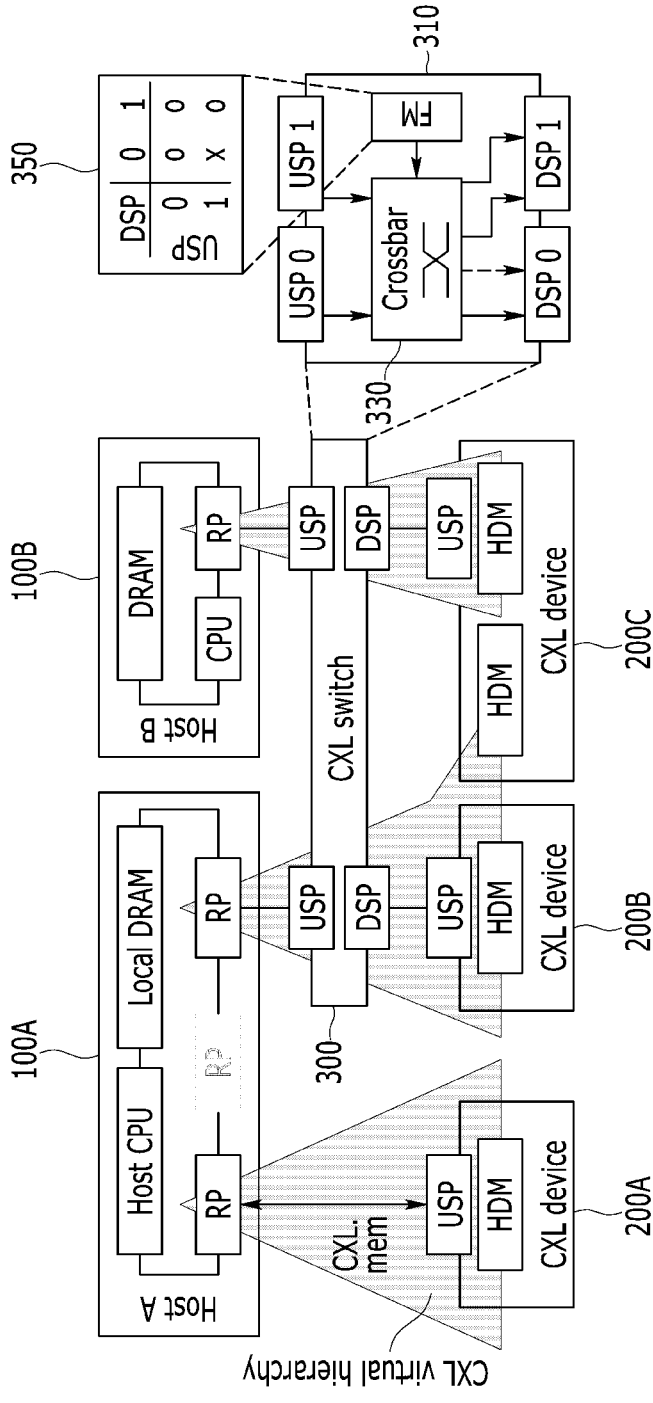
FIG. 5 is a diagram for describing a CXL switch based CXL network according to an exemplary embodiment.

FIG. 5 is a diagram for describing a CXL switch based CXL network according to an exemplary embodiment.

Referring to FIG. 5, in order to connect the host server 100 and the memory device 200, a network switch (hereinafter, referred to as a CXL switch) 300 may be used.

Root ports (RP) of host servers 100A and 100B may be connected an upstream port USP of a CXL based memory device 200A or upstream ports USP0 and USP1 of the CXL switch 300. Downstream ports DSP0 and DSP1 of the CXL switch 300 may be connected to USPs of a memory device 200B and a memory device 200C. Besides, the DSP of the CXL switch 300 may be connected to the USP of another CXL switch. The CXL packet may be transmitted between the host servers and the memory devices according to the CXL.mem protocol through connected ports.

The CXL switch 300 includes a plurality of upstream ports USP0 and USP1, and a plurality of downstream ports DSP0 and DSP1, and routes the CXL packet input according to an internal routing table. A plurality of host nodes may be connected to one CXL switch 300. Through this, the CXL switch 300 may connect a plurality of host nodes and a plurality of memory nodes, and generate a CXL virtual hierarchy connecting the remote memory resource from the host node based on the CXL.

The CXL switch 300 may include a fabric manager (FM) 310 managing an internal routing table 350, and a switching unit 330 setting a connection path (crossbar) between the USP and the DSP by the internal routing table 350.

The CXL switch 300 manages a unique host identifier for each host server through the routing table, and adds a host identifier to the CXL packet to determine an internal routing path of the CXL packet. In this case, the host identifier is made to be transmitted only in inter-switch communication to support multi-level connection of the CXL switches while following the CXL standard. This will be described in detail from FIG. 8.

Meanwhile, like the memory device 200C, a plurality of memory controllers and a plurality of memory resources (HDMs) may be included in one memory device. The plurality of memory resources (HDMs) of the memory device 200C may be defined as a plurality of logical devices (multi-logical devices, MLDs), and each logical device (LD) may be simultaneously used in different host servers. Therefore, different host servers 100A and 100B may be connected to the same memory device 200C.

As such, the host server may be directly connected to a single LD (SLD), or connected to the SLD or MLD through the CXL switch 300. In this case, each CXL virtual hierarchy is configured to provide only one path up to the remote memory resource (HDM) from one host, and disable multiple host nodes to share one remote memory resource.

Figure 6:
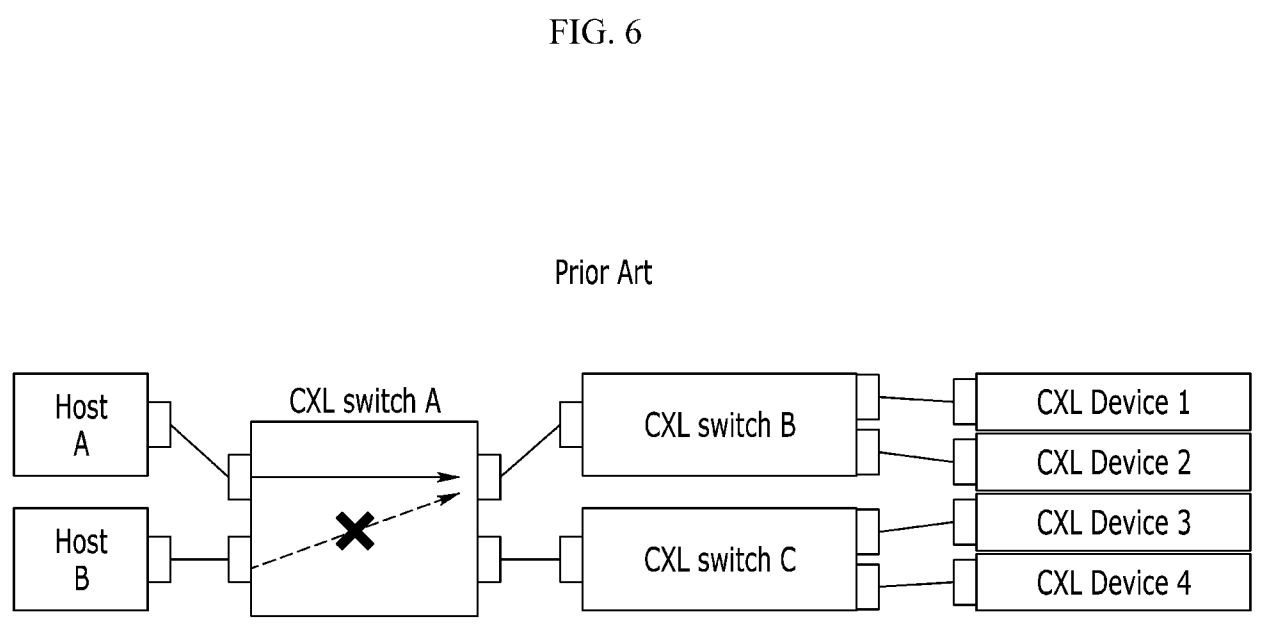
Figure 7:
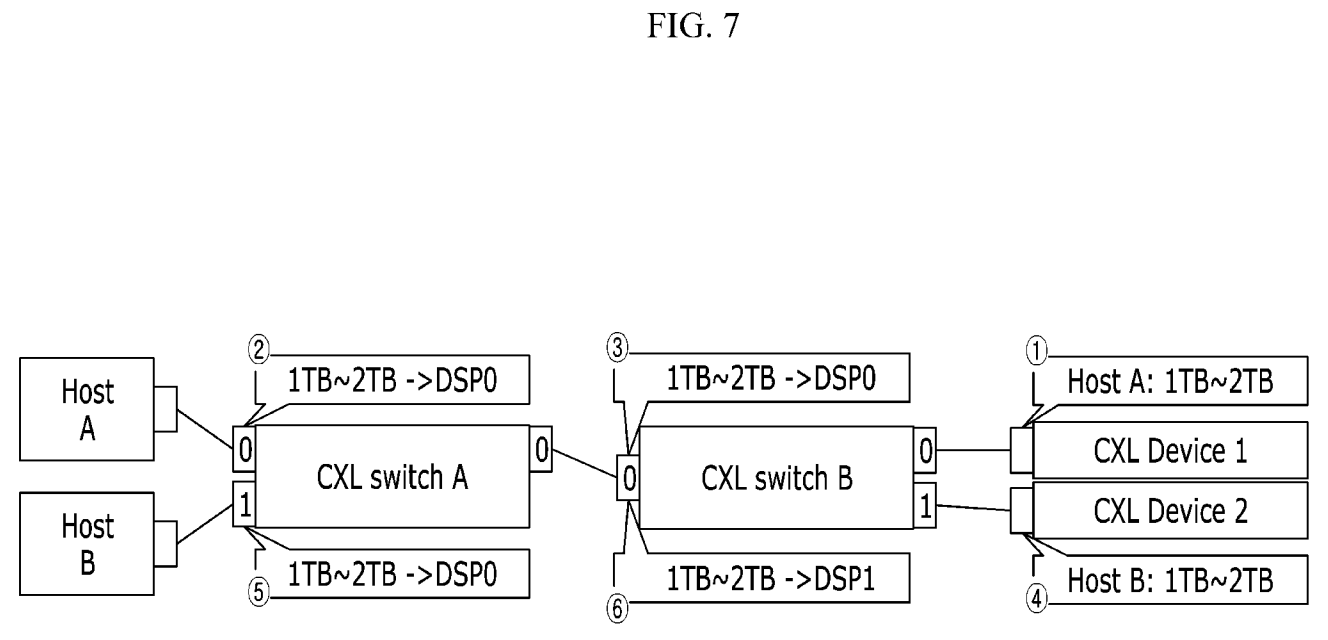

FIG. 6 is a diagram for describing a limitation of a conventional CXL switch and FIG. 7 is a diagram for describing a problem which occurs when attempting a connection of one DSP and multiple USPs.

Referring to FIG. 6, according to the CXL standard, it is assumed that when the CXL switch includes two or more USPs, there is a virtual CXL switch (VCS) for each USP. In this case, the host server may not know whether the CXL switch has multiple USPs, and may recognize the VCS connected thereto and only the DSP connected to the VCS. According to the CXL standard, except for a case where the device connected to the DSP supports the MLD, one DSP is limited to be connected to only one VCS. Therefore, when the CXL switches are connected multiple levels, there cannot but be a constraint.

It is assumed that CXL switch A that supports multiple roots has two USPs, and also has two DSPs, and each USP is connected to host A and host B. It is assumed that each DSP of CXL switch A is connected to CXL switch B and CXL switch C, and CXL switch B and CXL switch C do not support the multiple roots.

Since the switch is connected to each DSP of CXL switch A, one DSP may be connected to only one USP. Therefore, while host A is connected to CXL switch B, host B may not use CXL switch B. In this case, even though host A uses only one of the devices connected to CXL switch B, host B may not use the remaining devices connected to CXL switch B. Such a constraint degrades utilization of memory disaggregation and causes a memory over-provisioning problem because a specific host may not use the memory resource due to the limitation of the CXL switch even though there is an idle memory resource in an entire system.

Referring to FIG. 7, in order to solve the problem of FIG. 6, a method for connecting one DSP and multiple USPs may be attempted, but a host in which the CXL switch is connected to the USP may not be distinguished, so the CXL packet received through the DSP may not be routed to the USP. For example, it is assumed that two USPs of CXL switch A are connected to one DSP, CXL device 1 used by host A is connected to DSP0 of CXL switch B, and host B uses CXL device 2 in DSP1.

Host A may map CXL device 1 to the system memory space thereof, and use address regions of 1 TB to 2 TB in order to access the HDM. Therefore, information for routing a CXL packet having addresses between 1 TB and 2 TB to DSP0 is configured in USP0 of CXL switch A, and information for routing the CXL packet having addresses between 1 TB and 2 TB to DSP0 is configured in USP0 of CXL switch B, the CXL packet sent by host A may reach CXL device 1.

Similarly, host B may map CXL device 2 to the system memory space thereof, and use the address regions of 1 TB to 2 TB in order to access the HDM. Therefore, information for routing the CXL packet having addresses between 1 TB and 2 TB to DSP0 is configured in USP1 of CXL switch A, and information for routing the CXL packet having addresses between 1 TB and 2 TB to DSP1 is configured in USP0 of CXL switch B. In this case, two configurations are made for USP0 of CXL switch B by host A and host B, and CXL switch B may not distinguish which host writes the configuration and uses only information configured later. Therefore, CXL switch B transmits all CXL packets input into USP0 only to CXL device 2 of DSP1 configured later. Next, a method for solving a multi-level connection problem of the conventional CXL switch will be described.

Figure 8:
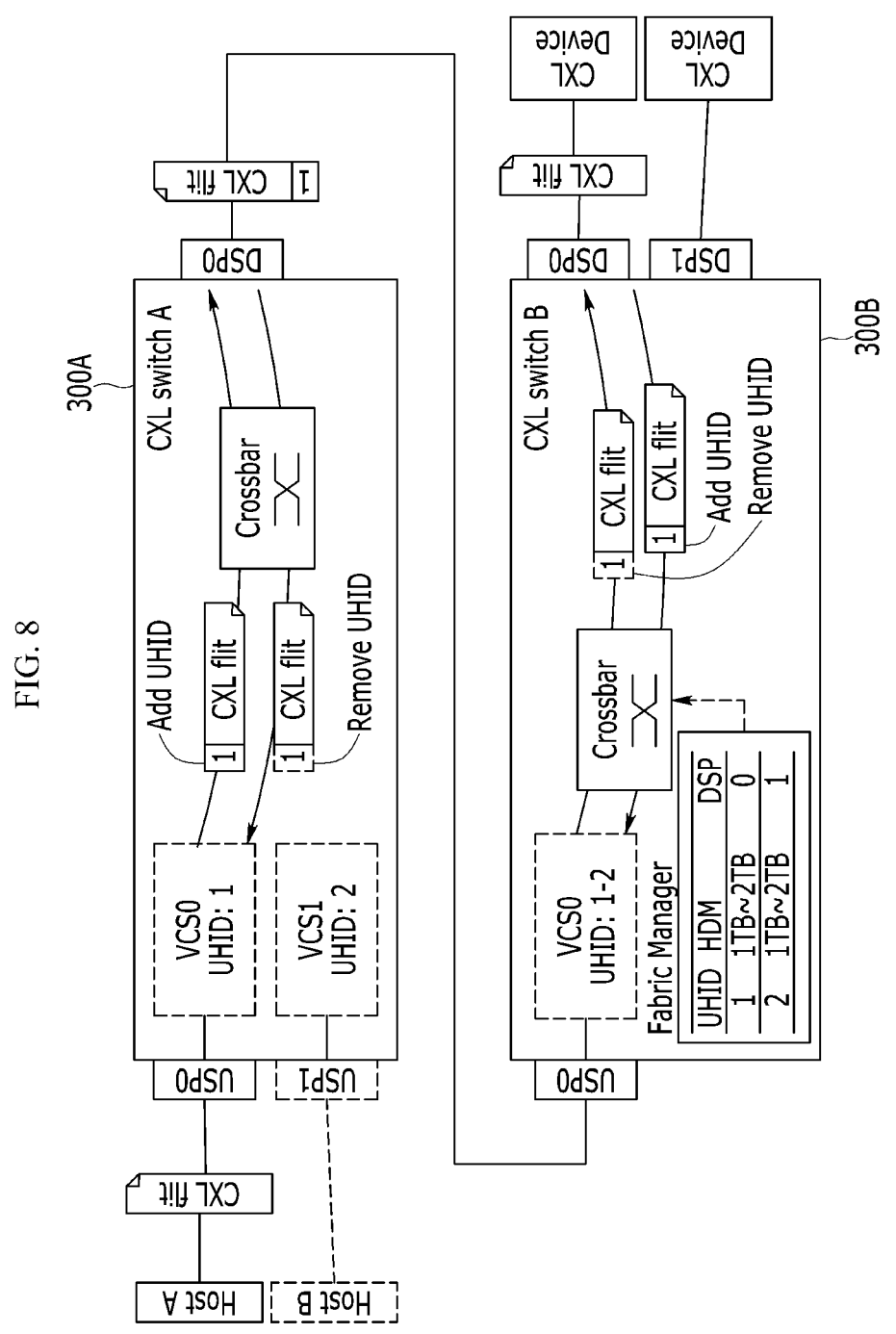
FIG. 8 is a diagram for describing an operating method of CXL switches connected at multiple levels according to an exemplary embodiment.

FIG. 8 is a diagram for describing an operating method of CXL switches connected at multiple levels according to an exemplary embodiment.

Referring to FIG. 8, for the multi-level connection of the CXL switch, a unique host ID (UHID) for each host server may be used upon transmitting the packet between CXL switches. A host server that transmits the CXL packet, or a host server which is to transmit a response may be identified through the UHID added to the CXL packet transmitted between the CXL switches. The fabric manager of the CXL switch may manage the CXL device and routing information used by the host, by using the UHID.

It is assumed that host A is connected to USP0 of CXL switch A 300A, and host B is connected to USP1. CXL switch A 300A including two or more USPs generates the virtual CXL switch (VCS) for each USP, and each VCS stores the UHID of the host connected to the corresponding USP. It is assumed that the UHID of host A connected to USP0 is 1 and the UHID of host B connected to USP1 is 2.

When the CXL packet (CXL flit) is input through USP0 into CXL switch A 300A, UHID 1 corresponding to the input USP0 is added to the CXL packet. Since the USP of another CXL switch B 300B is connected to DSP0 of CXL switch A 300A, the CXL packet to which the UHID is added is delivered to lower CXL switch B 300B. On the contrary, when the CXL packet is input through DSP0 of CXL switch A 300A, CXL switch A 300A determines VCS/USP to which a host to be routed is connected by comparing the UHID added to the CXL packet and the UHID for each VCS. When CXL switch A 300A routes the CXL packet to which UHID 1 is added to VCS0/USP0, host A is connected to USP0, so a CXL packet from which the UHID is removed is transmitted to USP0.

It is assumed that CXL switch B 300B is connected to a lower layer of CXL switch A 300A, and CXL switch B 300B is connected to a plurality of CXL devices through a plurality of DSPs. When the CXL packet is input into CXL switch B 300B through USP0, CXL switch B 300B determines the DSP to be routed by comparing the UHID to which the CXL packet is added and the UHID for each DSP. In addition, when CXL switch B 300B routes the CXL packet to DSP0, the CXL device is connected to DSP0, so the CXL packet from which the UHID is removed is transmitted to DSP0. On the contrary, when the CXL packet is input through DSP0 of CXL switch B 300B, CXL switch B 300B adds UHID 1 corresponding to DSP0 to the CXL packet based on the UHID for each DSP, and then transmits the CXL packet to VCS0 corresponding to UHID 1. In this case, CXL switch B 300B may generate VCS0 corresponding to USP0, and VCS0 may store host identifiers of host A and host B connected to USP0. Therefore, the CXL packet to which UHID 0 or 1 is added is transmitted to VCS0, and delivered to DSP0 of CXL switch A 300A through USP0.

Like CXL switch B 300B, if CXL switch A 300A is connected to USP0, the DSP to be routed may be known based on the UHID added to the CXL packet input through USP0. Alternatively, like CXL switch A 300A, if the host is connected to the USP, the DSP to route the CXL packet may be known through the UHID stored in the VCS of the USP.

The host identifier may be written to a reversed field of the CXL packet used in a CXL.mem protocol. The CXL packet to which the host identifier is added is used only for inter-switch communication, so the CXL packet does not influence another host or device.

The host identifier may be written to Local TLP Prefix of Transaction Layer Packet (TLP) used in the PCIe/CXL.io protocol. The Local TLP Prefix is used only for inter-switch communication, so the Local TLP Prefix does not influence another host or device.

As such, even though the host server and the CXL device are not modified, the UHID is used between the CXL switches, so the conventional multi-root and multi-level connection problem may be solved. That is, even though the host server and the CXL device following the CXL standard is not modified to use the UHID, the CXL packet is appropriately routed by the CXL switches, so the multi-level connection may be used without a constraint in a conventional CXL network.

Figure 9:
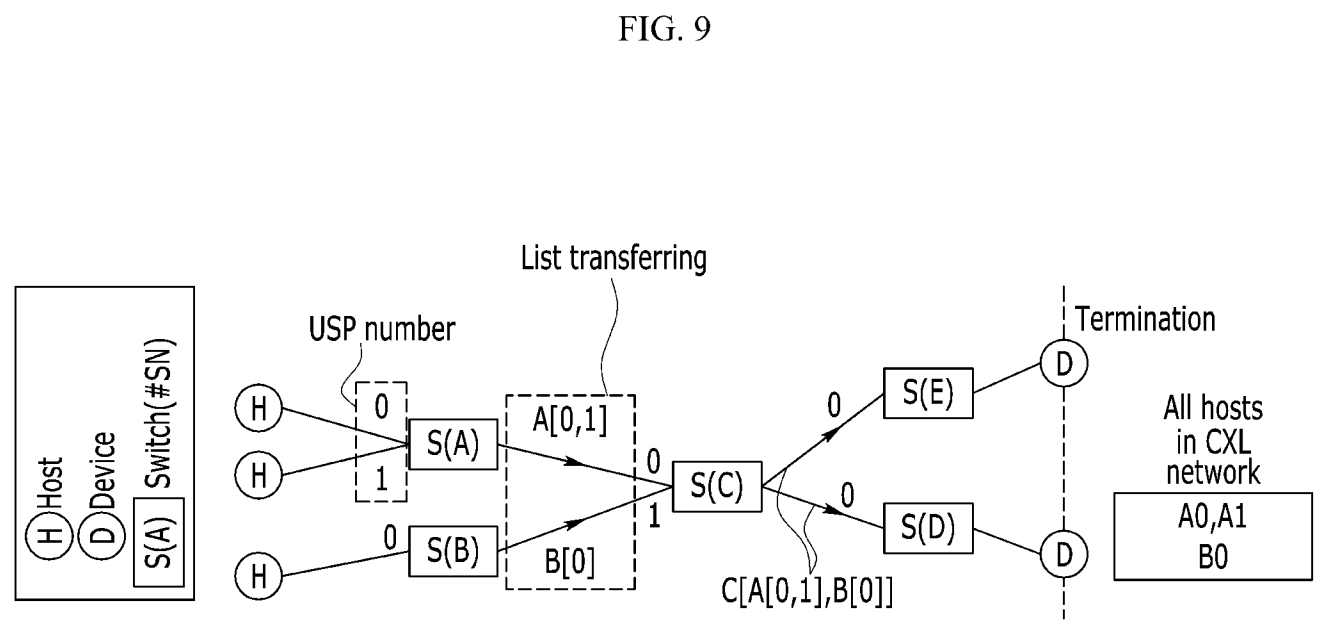

FIG. 9 is a diagram for describing a method for allocating a host identifier of a CXL network according to an exemplary embodiment.

Referring to FIG. 9, the unique host identifier (UHID) is assigned to the host server searched in the CXL network. A host identifier allocation method may be diversified, and a host list propagation based host identifier allocation method will be described.

It is assumed that the CXL network is constituted by five CXL switches S(A), S(B), S(C), S(D), and S(E), three host servers, and two CXL devices. Each of switches S(A) and S(B) in which the USP is connected only to the host server creates host lists A[0,1] and B[0] connected thereto, and transmits the host lists to the switch connected to the DSP. The switch S(C) transmits a host list C[A[0,1], B[0]] in which the lists received by the USP are combined into one to the DSP.

Since there is no switch to deliver the host list, the switches S(D) and S(E) in which only the CXL device is connected to the DSP deliver the completed host list C[A [0,1], B[0]] to the USP again to notify that all host servers are searched. When the completed host list is delivered up to the switches S(A) and S(B) in which only the host server is connected to the USP, the UHID may be allocated in the order of the host list. That is, the UHID of the host server connected to USP0 of the switch S(A) may be allocated as 0, the UHID of the host server connected to USP1 of the switch S(A) may be allocated as 1, and the UHID of the host server connected to USP0 of the switch S(B) may be allocated as 2.

Thereafter, the VCS of each switch is configured based on the host list in order to store ranges of hosts which the VCS of each switch may access through the VCS. For example, since the VCS may access hosts having UHIDs 0 and 1 through USP0 of the switch S(C), the switch S(C) may write UHIDs 0 and 1 to the VCS corresponding to USP0.

When the host list is delivered between the switches, Vendor-defined message of PCIe may be used. Since the message is used only in the inter-switch communication, whether the switch supports the UHID may also be determined by considering whether the message may be processed without influencing another host server or CXL device.

Figure 10:
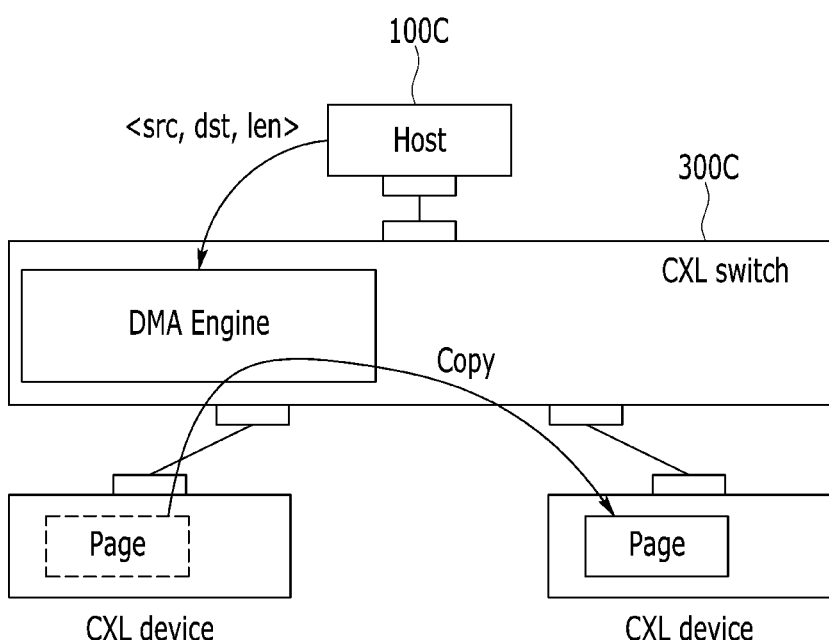
Figure 11:
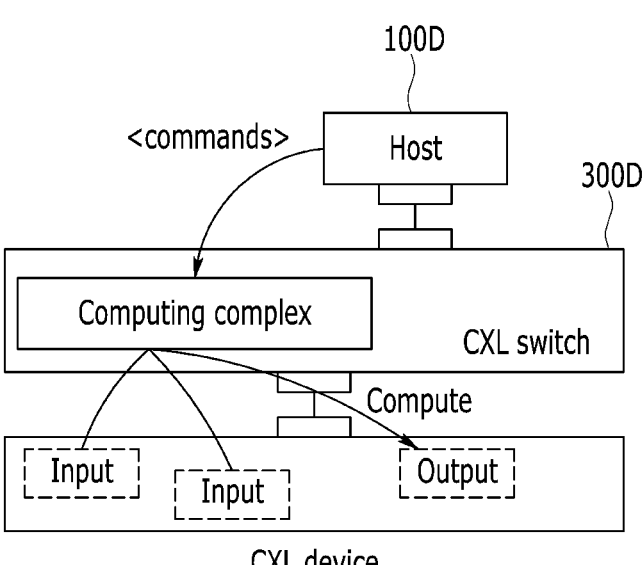
Figure 12:
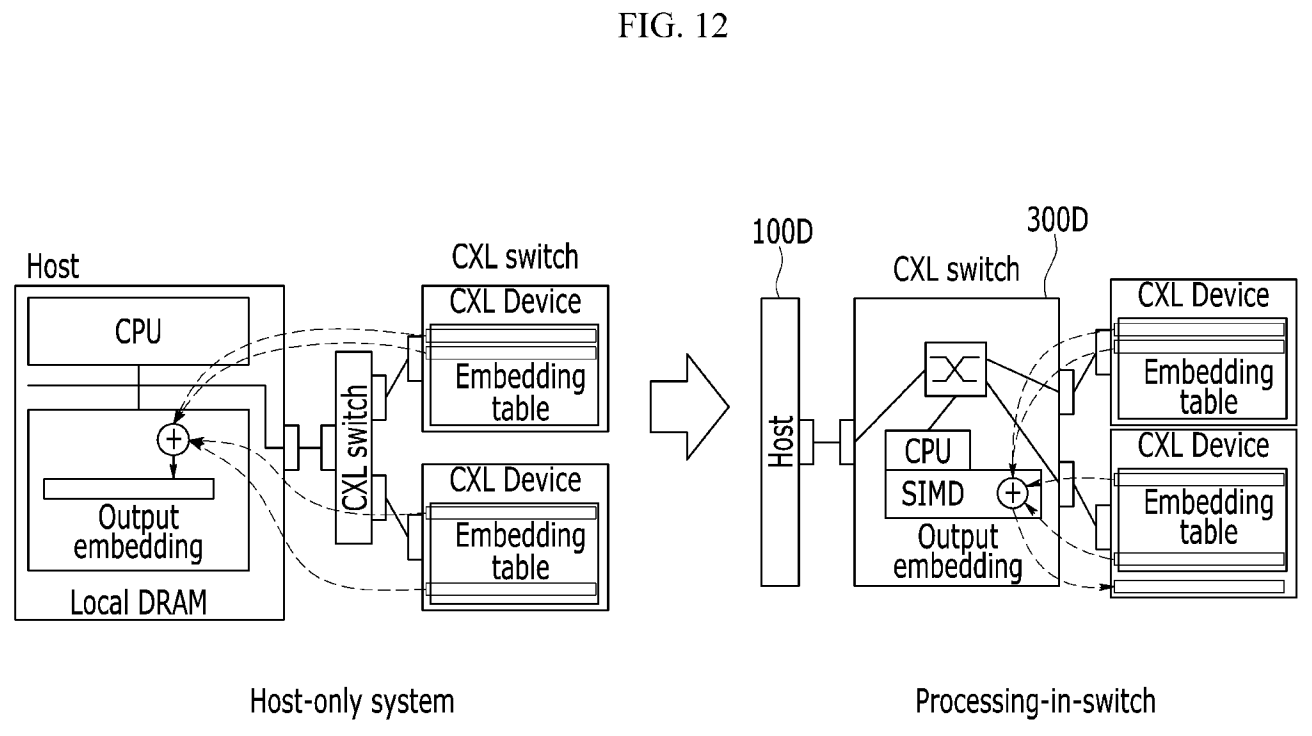
Figure 13A:
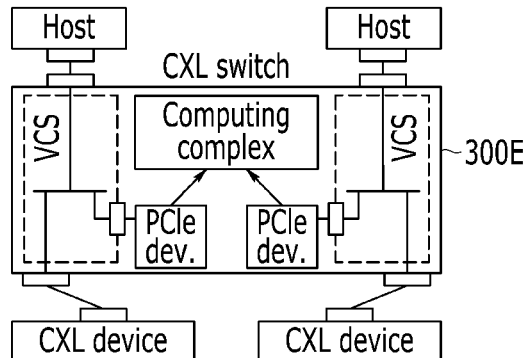
FIG. 13A and FIG. 13B are exemplary diagrams of a computing device interface of the CXL switch
Figure 13B:
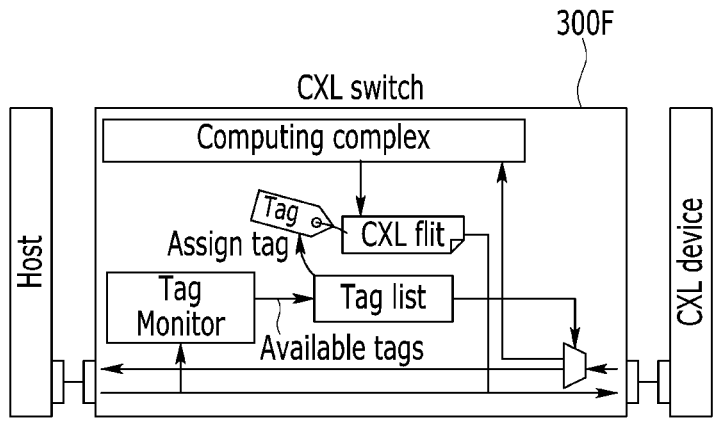

FIGS. 10 to 12 are diagrams for describing a method for utilizing a CXL switch having a computing ability according to another exemplary embodiment, and FIG. 13A and FIG. 13B are exemplary diagrams of a computing device interface of the CXL switch.

Referring to FIGS. 10 to 12, the CXL switch having the computing ability will be described. The CXL switch having the computing ability may use a partial computing of the host for various purposes such as offload, data migration, etc.

Referring to FIG. 10, the CXL switch 300C may include a direct memory access (DMA) engine, and have a computing ability to read and write data in a arbitrary HDM connected to the DSP thereof through the DMA engine.

When one of multiple HDMs used by the host server 100C is removed, data stored in the removed HDM should be moved to another HDM or local memory. Such a memory page migration task is conducted by a scheme in which the computing complex (CPU) of the host server 100C directly reads and writes data, but the CXL switch 300C having the computing ability may process data movement between HDMs instead.

When the host server 100C notifies the address of the HDM to access the memory to the CXL switch 300C including the DMA engine, the CXL switch 300C may perform memory copy by transmitting the CXL packet to directly access the HDM.

Referring to FIG. 11, the CXL switch 300D may include the computing complex, and perform various types of computing operations (e.g., character string search or data sorting used in a database, matrix multiplication, convolution, etc., used in machine learning) instead of the host server 100D. The computing complex used in the CXL switch 300D may be a general-purpose computing complex such as the CPU, or special-purpose hardware such as systolic array or vector processor.

Since PCIe/FlexBus connecting the host server or the memory device is slower than a local system bus, accessing the remote HDM by the host CPU is slower than accessing the local memory. Therefore, reading only the result processed by the CXL switch 300D near the HDM is more efficient than reading and processing a large amount of data from the HDM by the host server. Further, even though the CXL device has no computing ability, the CXL switch 300D may process data for the host server 100D, an effect of computing near the memory may be obtained.

The CXL switch 300D may perform embedding computing near the memory through the computing complex constituted by the vector processor and the CPU controlling the vector processor as illustrated in FIG. 12.

Since an embedding table of a recommended system is very large to several TBs or more, the embedding table is stored in most SSDs by utilizing a key-value storage. However, since the host server may use a very large memory by using CXL, entire embedding may be stored in the memory other than the storage.

If the host server of the recommended system uses the HDM through the CXL switch having no computing ability, a task of combining multiple embedding vectors scattered in the HDM into one vector is directly performed.

On the contrary, if the host server 100D is connected to the HDM through the CXL switch 300D having the computing ability, only a result computed by the CXL switch 300D may be used without a need for accessing all scattered embedding vectors. Since the CXL switch 300D having the computing ability performs the computing task near the memory, the task may be accelerated, and the host server 100D may perform another task during the computing task of the CXL switch 300D.

In the case of the CXL switch 300D having the computing ability, data to be computed should be particularly stored in the HDM which is accessible through the DSP of the switch. Therefore, the host performs cache flush so that there is no data cached to the host CPU before performing the computing to enforce required data to be stored in the HDM. Further, the switch may not access the data stored in the local memory, so the computing within the switch may not be utilized. Therefore, the computing within the switch may be utilized in an application program (e.g., the embedding table of the recommended system) that handles very large data which may not be stored in the local memory.

Referring to FIG. 13A and FIG. 13B, an interface for giving the command to the computing complex of the CXL switch by the host server is required.

Referring to FIG. 13A, the CXL switch 300E creates the computing complex as a virtual PCIe device to be used by the host.

The fabric manager of the CXL switch 300E may limit the host which may recognize the virtual PCIe device, and determine the host that may use the computing complex. The CXL switch 300E may create two or more virtual PCIe devices so that a plurality of hosts may simultaneously use the computing complex. The host may offload the task to the computing complex within the switch through a driver executed in a host operating system.

Referring to FIG. 13B, the computing complex of the CXL switch 300F may access the HDM according to a computing request of the host, and the computing complex of the CXL switch 300F may also access the same HDM, and the used UHID is the same. Therefore, it is necessary for the CXL switch 300F to distinguish whether the host sends the CXL packet or whether the internal computing complex sends the CXL packet. A unique tag value of the memory request may be used for the distinction.

The CXL switch 300F may include a tag monitor, and the tag monitor monitors tag values which are currently used by the host to manage a tag list which may be used by the internal computing complex. When the internal computing complex creates the memory request, a tag selected in a tag list is attached to the memory request, which is transmitted to the DSP. When the response is returned to the CXL device, the tag monitor may identify whether the tag used in the response is allocated in the switch or whether the tag used in the response is allocated in the host. If the tag used in the response is the tag allocated in the switch, the tag monitor may deliver the CXL packet to the internal computing complex, and if the tag used in the response is the tag allocated in the host, the tag monitor may route the CXL packet to the host.

If the tag allocated in the switch is used by the host, the tag monitor may replace a duplicated tag with a new tag and transmit the packet using the new tag, and if the response including the new tag is returned, the new tag is converted into an original tag to be transmitted to the host.

Figure 14:
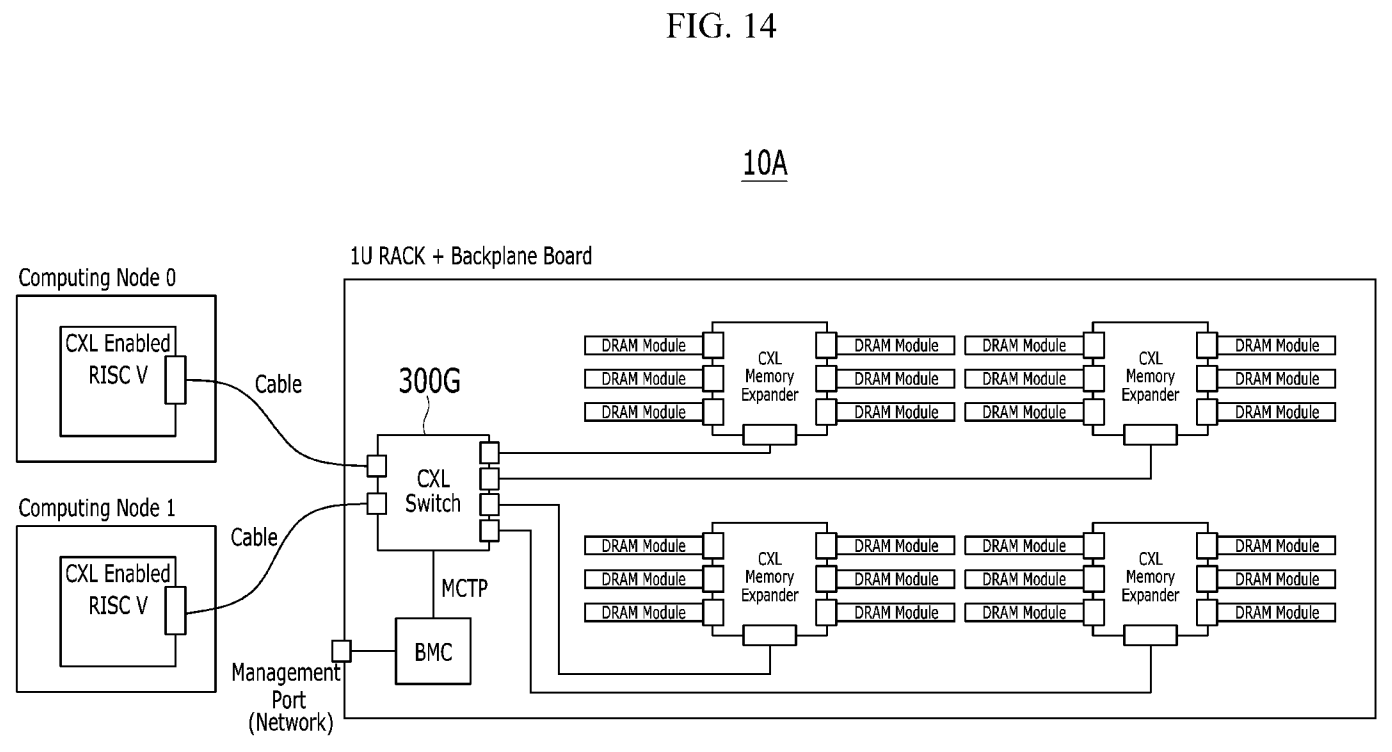
Figure 15:
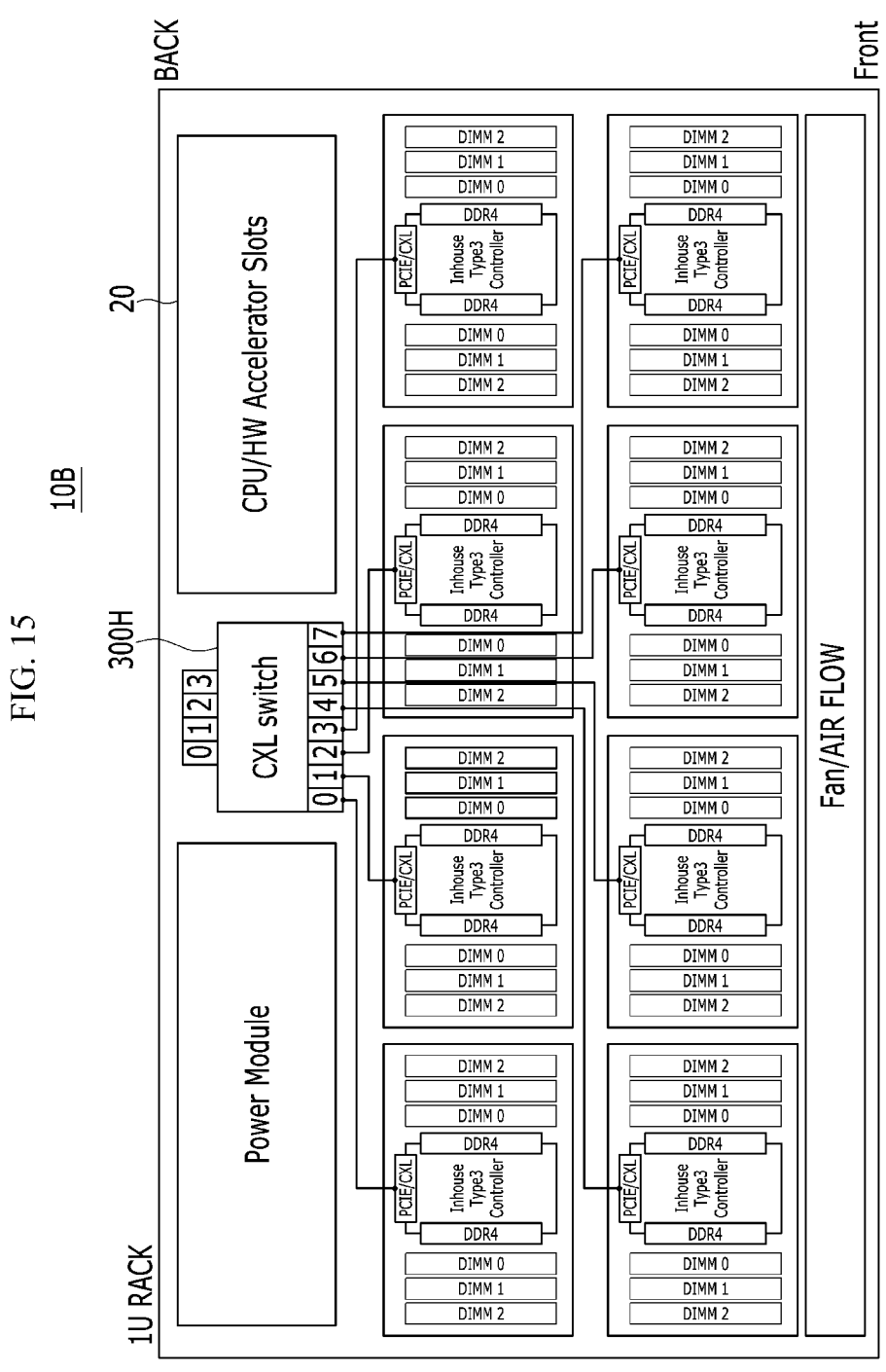
Figure 16:
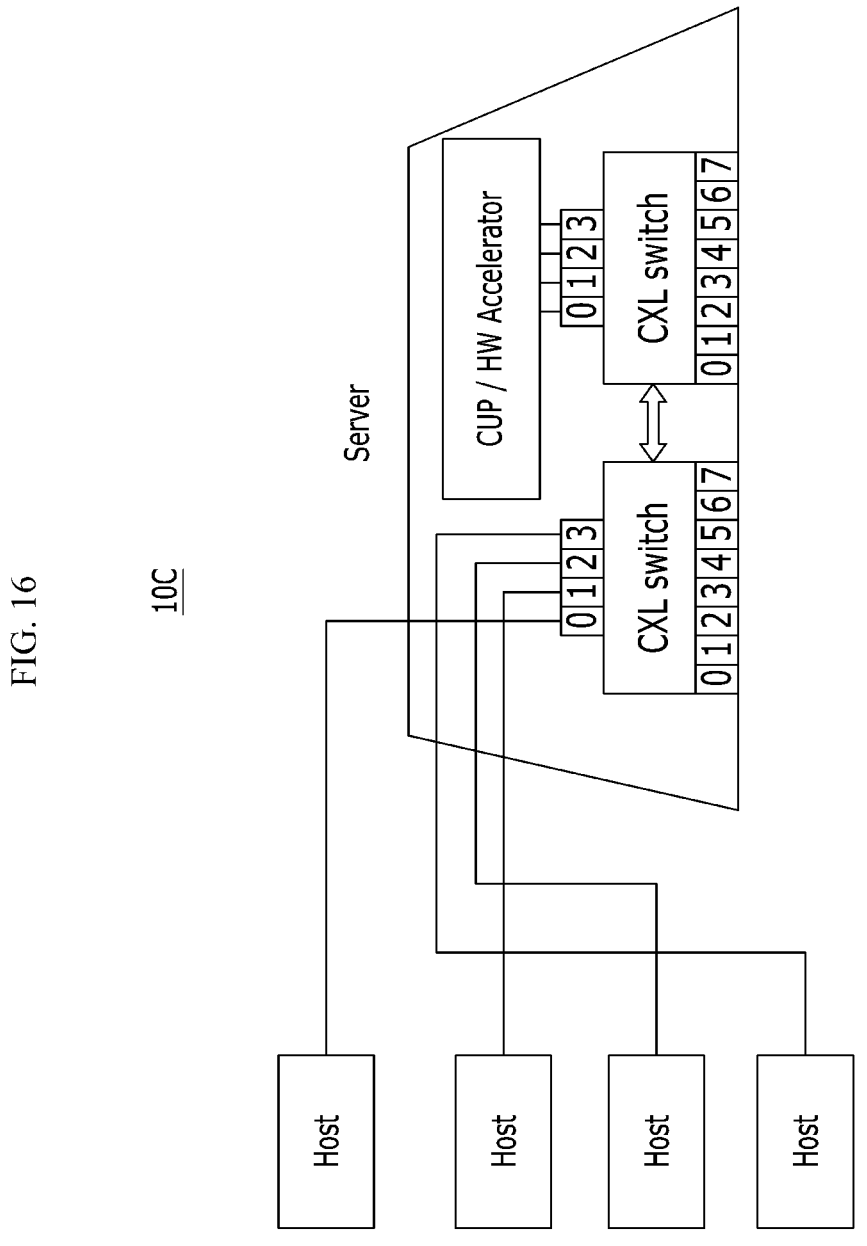

FIGS. 14 to 16 illustrate an architecture example of a CXL based memory disaggregation according to an exemplary embodiment.

Referring to FIG. 14, a CXL memory backplane will be described.

A memory disaggregation computing system 10A may be constituted by two host servers and four CXL devices (CXL memory expanders) by using one CXL switch 300G that supports multiple roots. Four CXL devices and the CXL switch 300G may be mounted on a single 1U server in a fixed type, and connected to the host server through a cable. The CXL switch 300G includes the computing complex (universal CPU or AI accelerator) to read and directly process data stored in each CXL device.

Host 0 (Computing Node 0) and host 1 (Computing Node 1) may attach and use CXL devices of a required number to the system memory spaces thereof. The CXL devices which may be used by hosts 0 and 1 may be determined by the fabric manager of the CXL switch 300G.

The CXL device may include six to eight memory controllers, and connect one to two DRAM modules per memory controller. In order to rapidly process the memory request accessed by the host, a bandwidth should be increased by using multiple DRAM modules simultaneously as much as possible. Since a user may mount DRAM modules as necessary, the following policy that interleaves data to each DRAM may be applied.

Interleaving may be configured to be performed in units of 4 KB. Best performance may be obtained when data should be interleaved in units of a cache line (64 bytes), but when only some memory modules should be replaced like a case where the memory module is out of order or an ECC error occurs, the number of lost pages in an entire memory space may be reduced only by dividing data by a page unit (4 KB) used by an operating system.

The memory controller may be preferentially configured to be interleaved. Since two memory modules connected to one memory controller may not be simultaneously used, data may be configured to be stored in each memory controller by a round-robin scheme, and next, data may be configured to be stored in a memory module connected to the same channel.

In order for the user to configure the HDM in which the host may access the fabric manager of the CXL switch 300G, an interface which communicates with the fabric manager is provided.

Since the CXL switch 300G is constituted by a server tied to the CXL device, the user may access the fabric manager through a Board Management Console (BMC) for remotely managing the server. The BMC and the CXL switch 300G may send and receive data with a management component transport protocol (MCTP), and the user may access a homepage which may configure the fabric manager through the network interface provided by the BMC. In order to reduce the number of components in the server, the BMC may be embedded in the CXL switch 300G, and the user may configure the fabric manager by accessing the CXL switch 300G through the network interface.

Referring to FIG. 15, the memory disaggregation computing system 10B may be extended to support eight CXL devices by using a large CXL switch 300H. For example, 48 to 128 DRAM DIMMs may be mounted on one 1U rack server, and another server or another CXL switch is connected to four USPs to perform memory disaggregation. A slot 20 for the CPU or the accelerator may be allocated to the 1U rack server.

The CPU or the accelerator may be mounted on the slot 20, and connected to the USP of the CXL switch. Then, the CPU or the accelerator may also utilize a large memory space provided by the CXL like the host. For example, when a GPU is connected to an accelerator slot, an internal memory of the GPU may be extended from tens of GB to TB scale.

In order to the accelerator such as the GPU to use a large memory space provided by the memory disaggregation, LLC of the GPU is modified to connect the HDM through the CXL. Like the CXL root port (RP) of the host, the root port (RP) is added to the GPU, and a separate PCIe slot is implemented to be connect an accelerator slot of the server.

Since the accelerator may use a large memory space provided by the memory disaggregation as such, a conventional application program (e.g., machine learning or scientific computing) that uses the memory or the storage of the CPU may load all required data to the GPU memory and rapidly compute the data due to a limit of a GPU memory size.

Referring to FIG. 16, the memory disaggregation computing system 10C may be configured to use two CXL switches like one. Each CXL switch includes four USPs and eight DSPs, but two switches communicate with each other through the interface to operate like a single switch including eight USPs and 16 DSPs.

If the single switch may have a lot of ports, the total number of switches required for connecting multiple hosts and devices is reduced. This may reduce a space for the switch to reduce a server size and save cost. However, the switch may not be made indefinitely large, which is limited to the size of the die and the number of pins which may be made in a semiconductor and packaging process, so currently produced PCIe switches are limited to the size of up to 128 lanes (16 lane 8 ports). Therefore, a technique of combining multiple switches and creating the switches into one switch is considered important.

Figure 17:
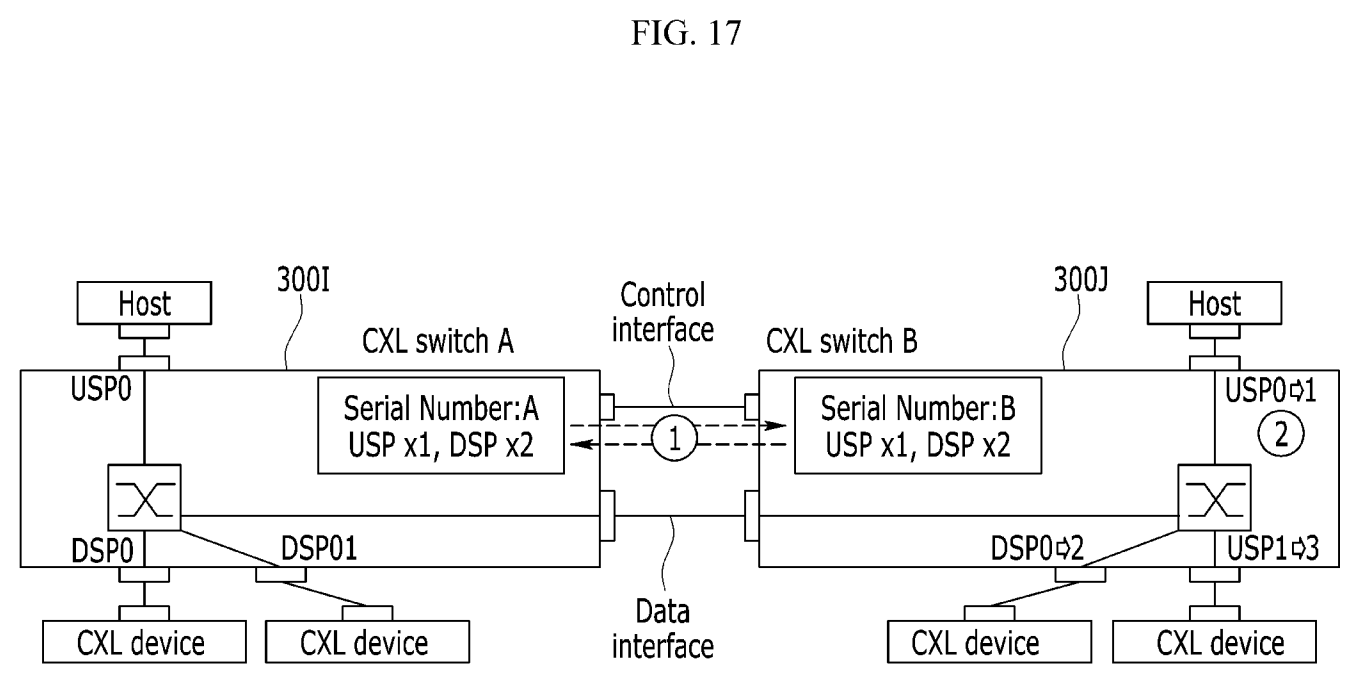
Figure 18:
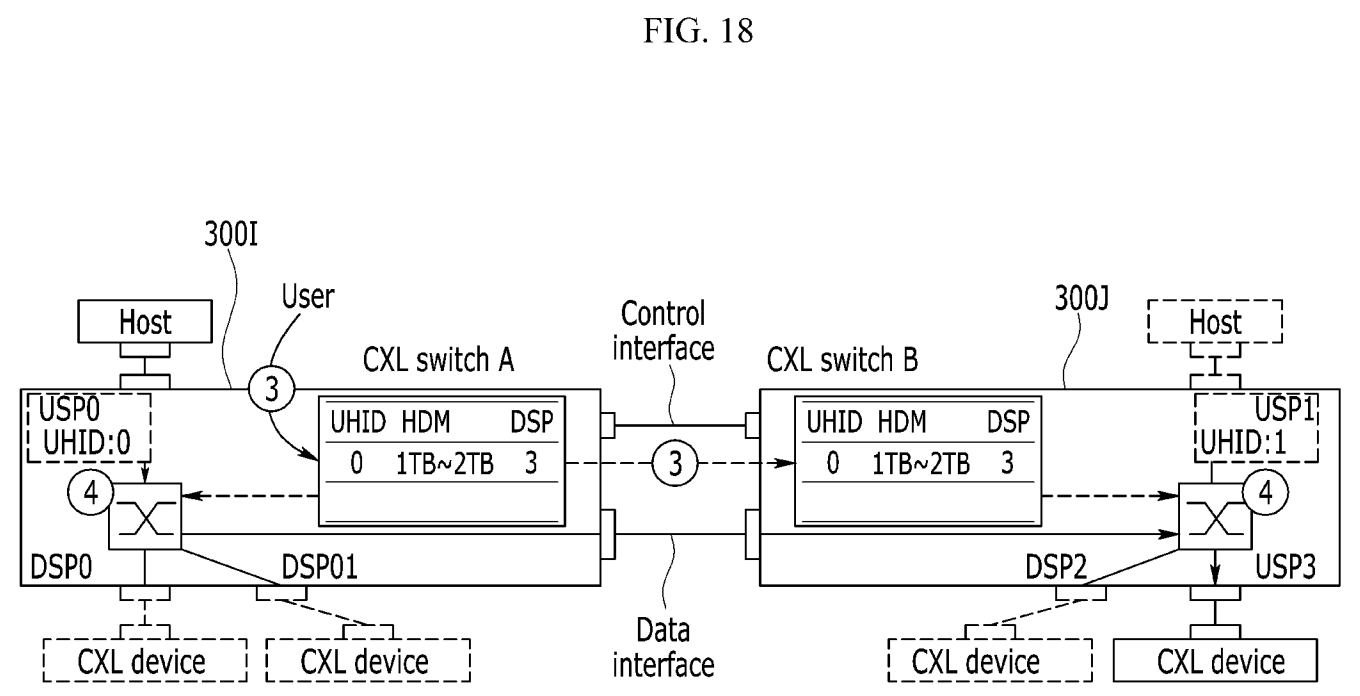

FIGS. 17 and 18 are diagrams for describing a combining method and an operating method of a CXL switch according to an exemplary embodiment.

Referring to FIG. 17, an inter-switch interface is defined in order to combine multiple CXL switches and create the CXL switches into one large switch. A data interface is an interface for sending and receiving the CXL packet between the switches, and a control interface is an interface for exchanging switch information (a port number and routing information). A method for combining two CXL switches 300I and 300J and creating the CXL switches into one switch will be described as an example.

Two CXL switches 300I and 300J may exchange port information (the number of USPs and the number of DSPs) thereof through the control interface (①), and allocate USP and DSP numbers in an order in which a unique number (e.g., a serial number) of the switch is low (②).

Since the unique number of the CXL switch 300I is low, the CXL switch 300I uses USP0, DSP0, and DSP1. The CXL switch 300J uses USP1, DSP2, and DSP3. The CXL switch 300J allocates the USP and DSP numbers thereof by considering the number of USPs and the number of DSPs of the CXL switch 300I.

Referring to FIG. 18, when a connection relationship of USP/VCS, UHID, and DSP is configured in the fabric manager of the switch, two CXL switches 300I and 300J share a routing table through the control interface (③). Two CXL switches 300I and 300J routes the input CXL packet based on the shared routing table (D).

For example, when information in which DSP3 is mapped to USP0/UHID 0 is configured in the fabric manager of the CXL switch 300I, the configured routing information is shared by the CXL switch 300J. Thereafter, when the CXL packet transmitted in the host is input into USP0, DSP3 of the CXL switch 300J is mapped to UHID 0 of USP0, so the fabric manager of the CXL switch 300I delivers the CXL packet to the CXL switch 300J through the data interface. The CXL switch 300J may deliver the CXL packet to DSP3 by referring to UHID 0 and the memory address of the CXL packet delivered through the data interface.

Figure 19:
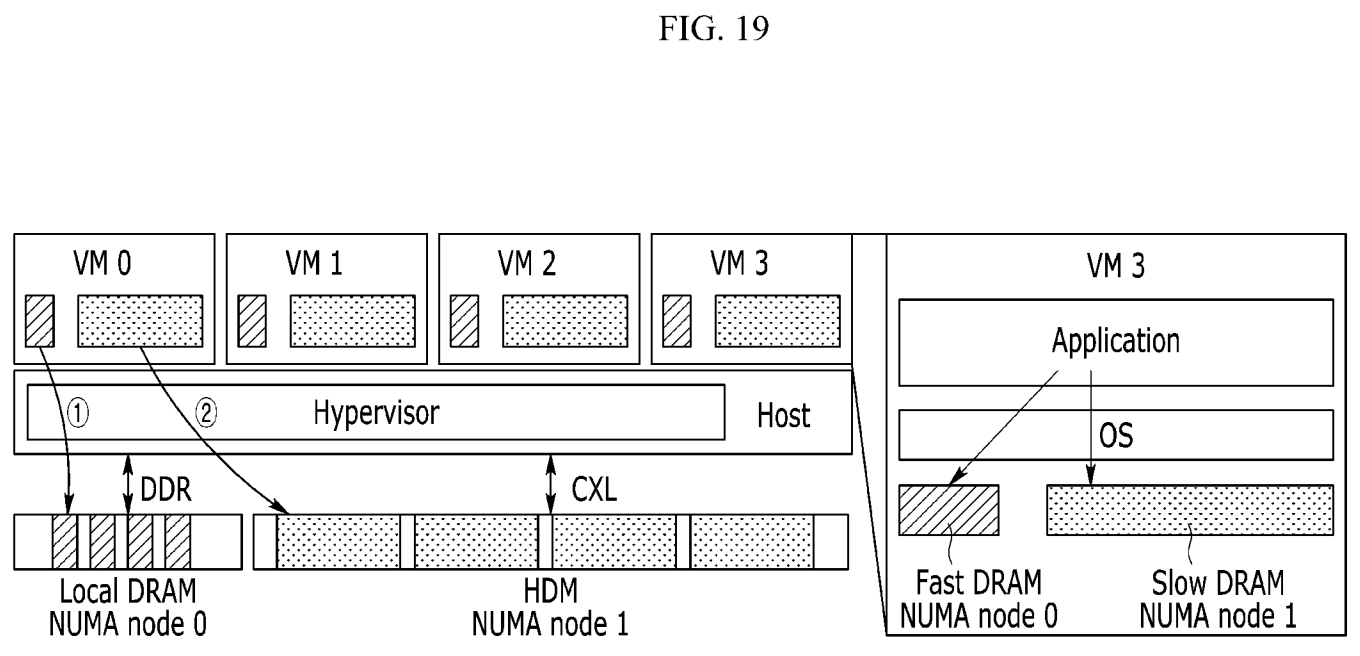

FIG. 19 is a diagram for describing a memory disaggregation method for a virtual machine according to an exemplary embodiment.

Referring to FIG. 19, the host server may map the remote HDM to the system memory space and use the HDM like a general local memory (DRAM). The operating system such as Linux distinguishes the local memory and the HDM as different Non-Uniform Memory Access (NUMA) nodes. This purpose is to allow the operating system to manage the memory to meet requirements of the application program such as preferentially using a fast local DRAM.

For example, when Hypervisor of the host executes a virtual machine (VM), a memory space may be allocated to the virtual machine. The host in which the Hypervisor is executed may manage a fast local memory as NUMA node 0 and a slow HDM as NUMA node 1.

While the Hypervisor of the host creates the virtual machine, when the virtual machine is allocated with a space to be used as the system memory from a host operating system, a usable memory may be distinguished through a NUMA node number. Through this, while the Hypervisor of the host executes a plurality of virtual machines, a part of the fast local memory and a part of the slow HDM may be simultaneously provided to each virtual machine. The operating system executed in the virtual machine is allowed to distinguish the local memory and the HDM, so the operating system and the application program may determine to which memory data used thereby is to be loaded.

As such, the fast local memory and the slow HDM may be distinguished and used, so cloud service providing companies providing a service through the virtual machine may set the prices per capacity of the local memory and the HDM. The use may mount more HDMs which are cheap and have a large capacity than expensive local memories as necessary.

Figure 20:
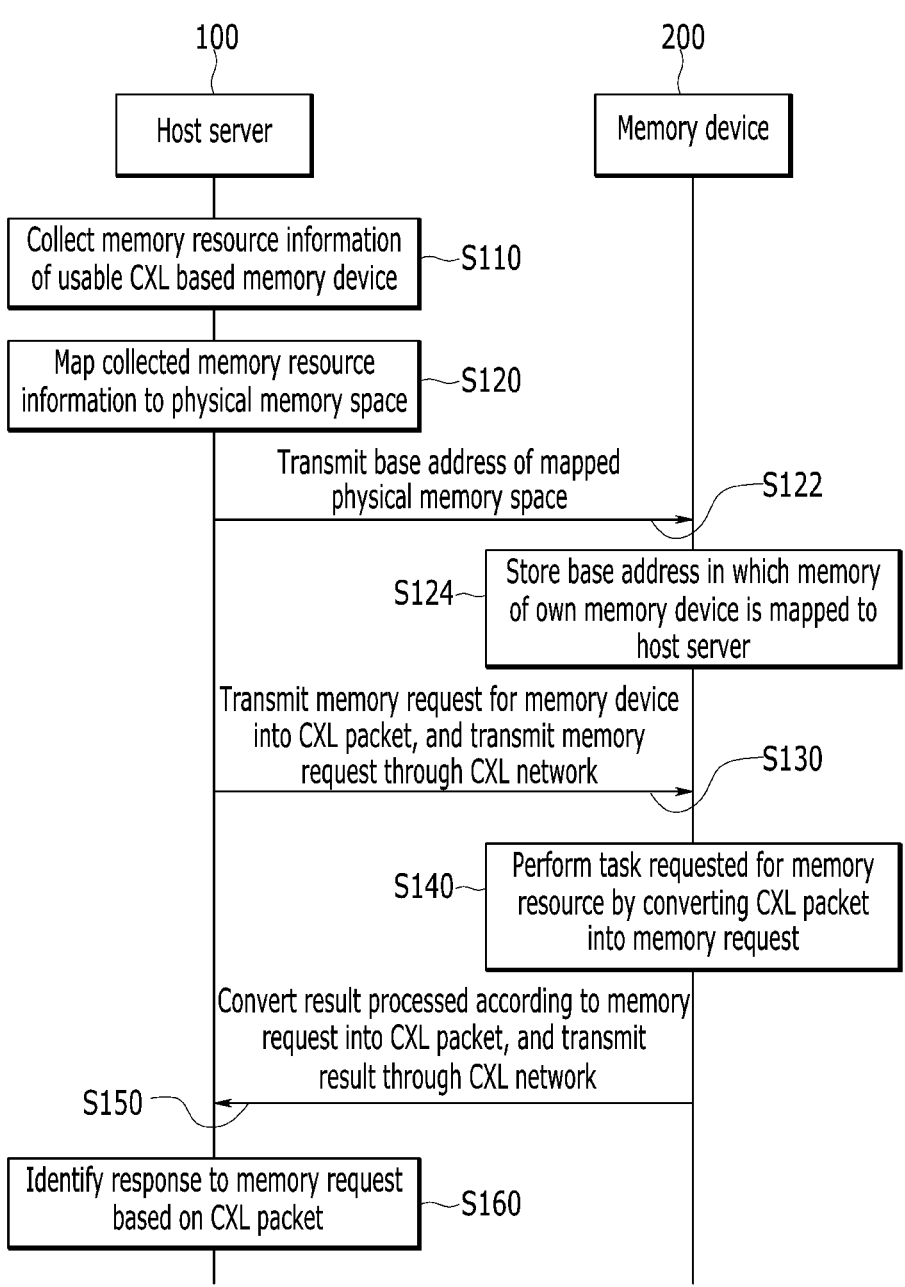
FIG. 20 is a flowchart of a memory disaggregation method according to an exemplary embodiment.

FIG. 20 is a flowchart of a memory distribution method according to an exemplary embodiment.

Referring to FIG. 20, a host server 100 collects memory resource information of a usable CXL based memory device 200 (S110). The host server 100 may collect the memory resource information through a CXL.io protocol. The memory resource information may include a base address register size (BAR size) and a memory size (HDM size) managed by the host server, and include memory identification information (e.g., bus, device, function, number, etc.).

The host server 100 maps the collected memory resource information to the physical memory space (S120), and transmits the base address of the mapped physical memory space to the memory device 200 (S122). The memory device 200 stores a base address in which a memory resource (BAR and HDM) is mapped to the host server 100 is stored in a configuration space (S124)

The host server 100 converts a memory request for the memory device 200 into a CXL packet, and transmits the CXL packet to the memory device 200 through a CXL network (S130). The memory request may include a data load command from the HDM and a data store command in the HDM. In regard to an operation inside the host server 100, when a computing complex (CPU) 110 makes a memory request of the load/store command from/in the system memory space to which the HDM is mapped, the memory request may be delivered to a root port (RP), and the root port (RP) may convert the memory request into the CXL packet, and transmit the CXL packet to the memory device 200 corresponding to an end point (EP). Here, the CXL packet may be transmitted through a CXL.mem protocol in a CXL network. When the CXL packet is transmitted via a CXL switch 300, connection information between a USP and a DSP for connecting the host server 100, at least one CXL switch 300, and the memory device 200 may be configured in each device.

The memory device 200 converts the CXL packet received through a network interface into the memory request to perform a task requested for a memory resource (S140). When the CXL packet is input through the network interface, a CXL controller 210 of the memory device 200 may generate an internal memory address based on the base address of the HDM included in the CXL packet, and deliver a memory request including the internal memory address to the memory controller 230.

The memory device 200 converts a result processed according to the memory request into the CXL packet, and transmits the CXL packet to the host server 100 through the CXL network (S150). When the memory controller 230 of the memory device 200 transmits the result processed according to the memory request to the CXL controller 210, the CXL controller 210 may convert the result into the CXL packet.

The host server 100 identifies a response to the memory request based on the CXL packet (S160). The host server 100 may receive a response to the result processed by the memory device 200 according to the memory request.

FIG. 21 is a flowchart illustrating an operating method of a CXL switch for a multi-level connection according to an exemplary embodiment.

Referring to FIG. 21, the CXL switch 300 configures a host identifier of the host server in at least one USP (or VCS of the USP) based on a host list propagation between the CXL switches connected to the CXL network (S210). When there is a plurality of host servers connected to the USP, a plurality of host identifiers may be configured in one USP (or VCS of the USP). The CXL network is a network that connects the host servers and the memory devices through the CXL protocol. The host identifier is information which is transmitted only between the switches, and removed no to be included in the CXL packet transmitted to the host server or the memory device.

The CXL switch 300 stores the USP/VCS, the host identifier configured in the USP/VCS, and a routing table to which the DSP is mapped (S220). The routing table may include the USP and the DSP mapped for each host identifier. The routing table may be managed by a fabric manager. The routing table may further include the type of device (e.g., the switch, the host server, the memory device, etc.) connected to each port.

When the CXL packet is input through any USP, the CXL switch 300 routes the CXL packet to the DSP mapped to the input USP based on the routing table, and routes a CXL packet to which the host identifier of the USP is added to the DSP if the mapped DSP is the other CXL switch, and routes a CXL packet not including the host identifier to the DSP if the mapped DSP is the memory device (S230). When the CXL packet input into the USP of the CXL switch 309 is the packet transmitted from the host server, and the mapped DSP is the other CXL switch, the host identifier is added to the CXL packet, which is transmitted, and when the mapped DSP is the memory device, the CXL packet not including the host identifier may be transmitted. When the CXL packet input into the USP of the CXL switch 309 is a packet transmitted from a higher CXL switch, the CXL packet includes the host identifier, and when the mapped DSP is the other CXL switch, the CXL packet including the host identifier may be transmitted as it is, and when the mapped DSP is the memory device, the host identifier may be removed from the CXL packet, and then the CXL packet may be transmitted.

When the CXL packet is input through any DSP, the CXL switch 300 routes the CXL packet to the USP mapped to the input DSP based on the routing table, and routes a CXL packet to which the host identifier mapped to the DSP is added to the DSP if the mapped USP is the other CXL switch, and routes the CXL packet not including the host identifier to the USP if the mapped USP is the host server (S240).

FIG. 22 is a flowchart illustrating an operating method of a CXL switch for a switch combination according to an exemplary embodiment.

Referring to FIG. 22, the CXL switch 300 exchanges port number (the number of USPs and the number of DSPs) with at least one other combined CXL switch, and configures a port number allocated according to a scheme designed to ports (S310). The CXL switch 300 may exchange port information of the CXL switch with at least one other combined CXL switch, and configure different port numbers in ports of the combined CXL switches.

The CXL switch 300 shares the routing table configured in the fabric manager with at least one other combined CXL switch (S320). The routing table may include the USP/VCS, the host identifier, and a connection relationship of the DSP.

The CXL switch 300 identifies a routing port of an input CXL packet based on the shared routing table switch, transmits a packet when the routing port is the port of the CXL switch, and transmits the packet to the other CXL switch when the routing port is the port of the other CXL switch (S330).

The exemplary embodiments of the present invention described above are not implemented only through the apparatus and the method and can be implemented through a program which realizes a function corresponding to a configuration of the exemplary embodiments of the present invention or a recording medium having the program recorded therein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A memory disaggregation computing system comprising:

a host server and a memory device connected through a compute express link (CXL) network, wherein a computing complex of the host server is connected to a memory resource of the memory device through a CXL packet transmitted through the CXL network, and executes an application program by using the memory resource, wherein the host server is configured to:

collect information about a memory resource of the memory device, map the memory resource to a physical memory space of the host server based on the information, and transmit to the memory device a base address of the physical memory space to which the memory resource is mapped, and wherein the memory device is configured to store the base address in which the memory resource of the memory device is mapped to the physical memory space of the host server.

2. The memory disaggregation computing system of claim 1, wherein the memory device includes:

the memory resource, a memory controller of the memory resource, and a CXL controller receiving a first CXL packet including a memory request of the host server, converting the first CXL packet into the memory request for the memory controller, and delivering the memory request, and converting a result processed by the memory controller into a second CXL packet, and transmitting the second CXL packet to the host server.

3. The memory disaggregation computing system of claim 2, wherein the memory request includes a data load command in the memory device or a data store command in the memory device.

4. The memory disaggregation computing system of claim 1, wherein the CXL packet is transmitted according to a CXL.mem protocol.

5. The memory disaggregation computing system of claim 1, wherein the information and the base address are transmitted according to a CXL.io protocol.

6. The memory disaggregation computing system of claim 1, further comprising:

at least one CXL switch connecting the host server and the memory device.

7. A memory disaggregation computing system comprising:

a host server and a memory device connected through a compute express link (CXL) network including CXL switches, wherein a computing complex of the host server is connected to a memory resource of the memory device through a first CXL packet transmitted through the CXL network, and executes an application program by using the memory resource, wherein a first CXL switch is configured to:

configure a host identifier of at least one host server for each upstream port (USP), upon receiving a second CXL packet whose destination port is connected to a second CXL switch, add a corresponding host identifier to the second CXL packet, and transmit to the second CXL switch the second CXL packet to which the corresponding host identifier is added.

8. A memory disaggregation computing system comprising:

a host server and a memory device connected through a compute express link (CXL) network including at least one CXL switch, wherein a computing complex of the host server is connected to a memory resource of the memory device through a CXL packet transmitted through the CXL network, and executes an application program by using the memory resource, wherein the CXL switch includes a computing complex configured to process a command from the host server, and wherein the computing complex is configured to:

in response to the command, perform an operation on data stored in the memory resource on behalf of the host device by accessing the memory device, and provide a result of the operation to the host server.

9. The memory disaggregation computing system of claim 1, wherein the memory resource includes a base address register (BAR) and a memory of the memory device managed by the host server.

10. The memory disaggregation computing system of claim 9, wherein the information includes a size of the BAR and a size of the memory.

11. The memory disaggregation computing system of claim 7, wherein the first CXL switch is further configured to:

upon receiving a third CXL packet whose destination port is connected to the host device or the memory device, remove the corresponding host identifier added to the third CXL packet, and transmit the third packet in which the corresponding host identifier is removed to the host device or the memory device.

* * * * *